(12) United States Patent
Randle et al.

(10) Patent No.: US 7,627,532 B2
(45) Date of Patent: Dec. 1, 2009

(54) METHOD FOR CREATING AND MANAGING SECURE SERVICE COMMUNITIES

(76) Inventors: William M. Randle, 2839 Bryden Rd., Bexley, OH (US) 43209; Randall E. Orkis, 2726 State Route 310 N., Pataskala, OH (US) 43062

( * ) Notice: Subject to any disclaimer, the term of this patent is extended or adjusted under 35 U.S.C. 154(b) by 514 days.

(21) Appl. No.: 11/355,861

(22) Filed: Feb. 16, 2006

(65) Prior Publication Data

US 2006/0248330 A1    Nov. 2, 2006

Related U.S. Application Data

(63) Continuation-in-part of application No. 11/337,394, filed on Jan. 23, 2006, and a continuation-in-part of application No. 11/298,121, filed on Dec. 9, 2005, and a continuation-in-part of application No. 11/154,033, filed on Jun. 15, 2005, and a continuation-in-part of application No. 10/967,991, filed on Oct. 19, 2004, and a continuation-in-part of application No. 10/823,442, filed on Apr. 12, 2004, and a continuation-in-part of application No. 10/459,694, filed on Jun. 11, 2003.

(60) Provisional application No. 60/679,295, filed on Oct. 19, 2004, provisional application No. 60/694,456, filed on Jun. 27, 2005.

(51) Int. Cl.
   *G06F 17/60* (2006.01)

(52) U.S. Cl. .............................. 705/65; 705/50; 705/51

(58) Field of Classification Search ................... 705/65, 705/50, 51
See application file for complete search history.

(56) References Cited

U.S. PATENT DOCUMENTS

| 6,735,291 | B1 * | 5/2004 | Schmid et al. .............. 379/189 |
| 2005/0071283 | A1 | 3/2005 | Randle et al. |
| 2006/0015450 | A1 | 1/2006 | Guck et al. |
| 2006/0053290 | A1 | 3/2006 | Randle et al. |
| 2006/0107036 | A1 | 5/2006 | Randle et al. |
| 2007/0088846 | A1 * | 4/2007 | Adams et al. ............... 709/237 |

FOREIGN PATENT DOCUMENTS

JP          2000324104 A    * 11/2000

OTHER PUBLICATIONS

U.S. Appl. No. 10/890,495, Christopher D. Guck et al.
U.S. Appl. No. 10/823,442, filed Mar. 31, 2005, William M. Randle et al.
U.S. Appl. No. 10/967,991, filed May 18, 2006, William M. Randle et al.
U.S. Appl. No. 11/154,033, filed Mar. 9, 2006, William M. Randle et al.

* cited by examiner

*Primary Examiner*—Pierre E Elisca
(74) *Attorney, Agent, or Firm*—Porter, Wright, Morris & Arthur, LLP

(57) ABSTRACT

A virtual secure service oriented network and process model for the creation and management of secure service communities including a private secure digital courier means for the secure and auditable movement of digital information over any network connection wherein end to end security is provided.

23 Claims, 18 Drawing Sheets

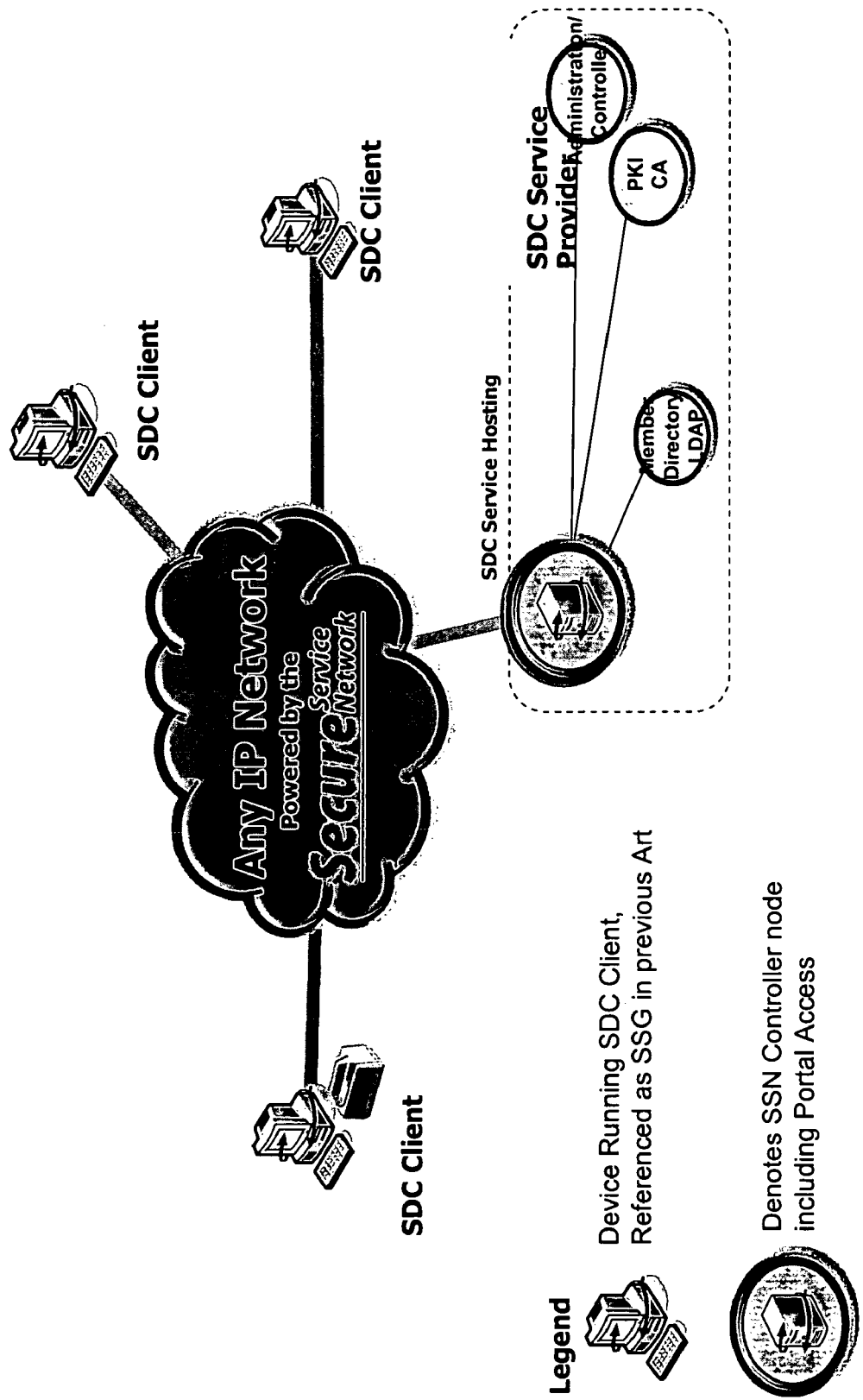
Figure 1: Simple SDC SSN Configuration

Figure 2: Traditional Physical Network and Application Configuration

In Traditional Networked World, Applications / Users are tightly coupled to a physical network topology as shown below.

The Result: Elements of Security are implemented inconsistently in the network and by applications; Networks are limited to Perimeter Security and as a result are only as secure as their weakest on ramp and/or least secure application riding over them; and Costs are excessive and physical provisioning drives long lead times for any new functionality

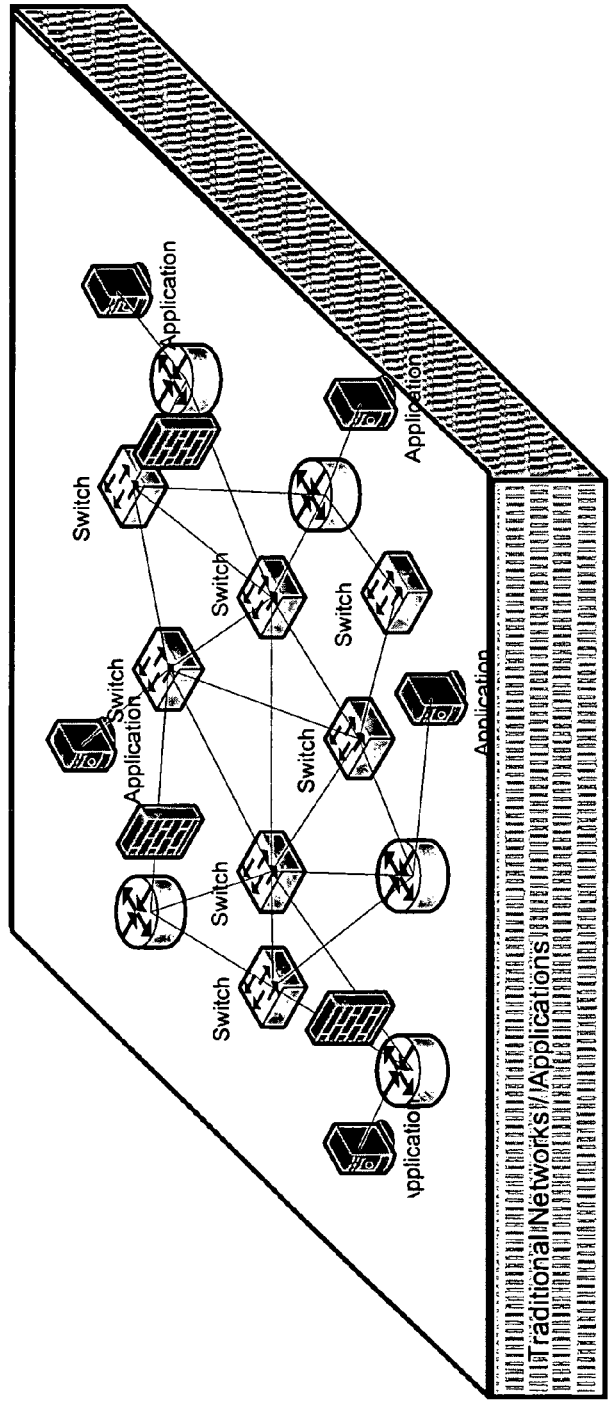

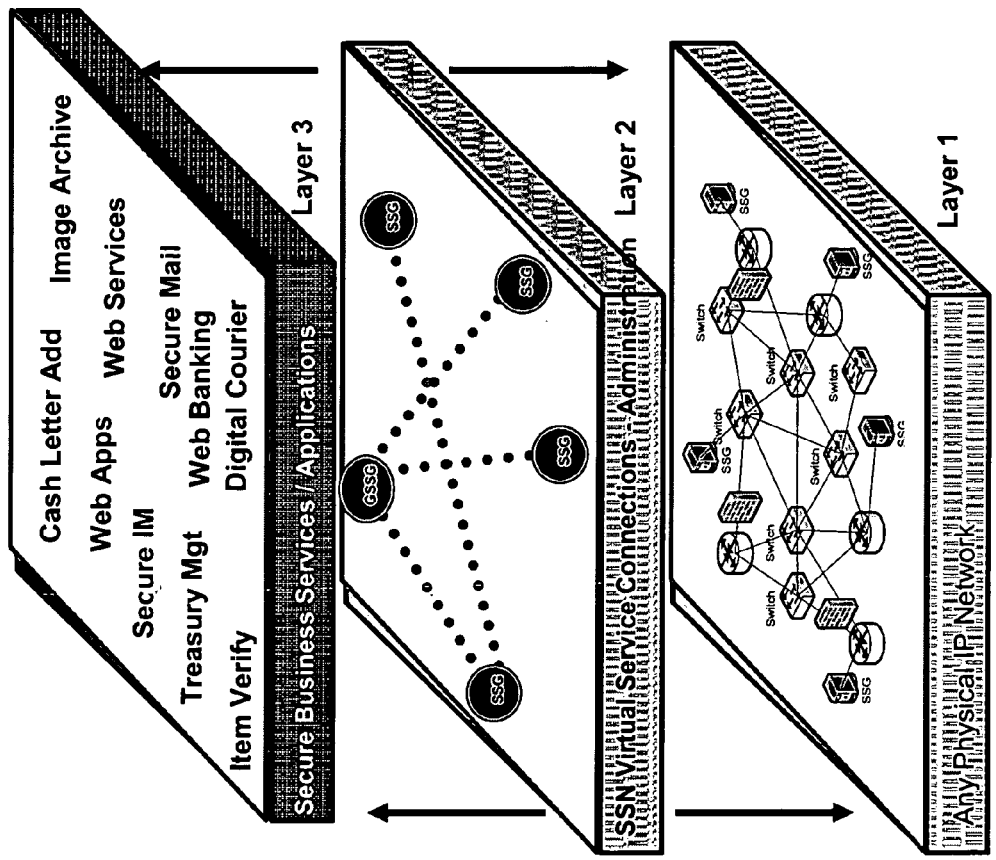
Figure 3: Simple SDC SSN Layers, Topology Management and Administration

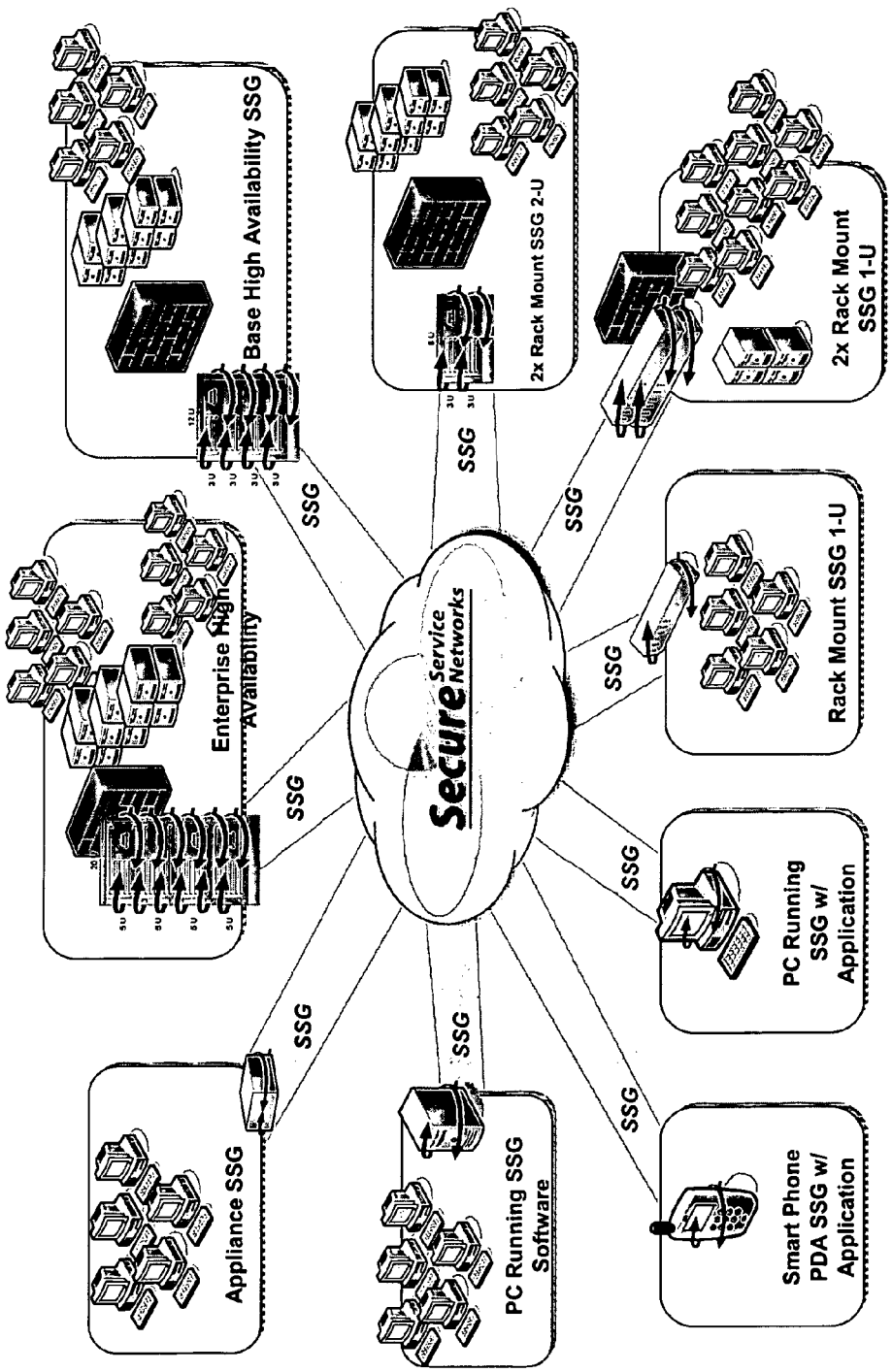
Figure 4: Sample SSN Participant Configurations / Packaging
SSN Configuration Diagram
Large Corporate Gateways to Single Wireless Users and Software Agents

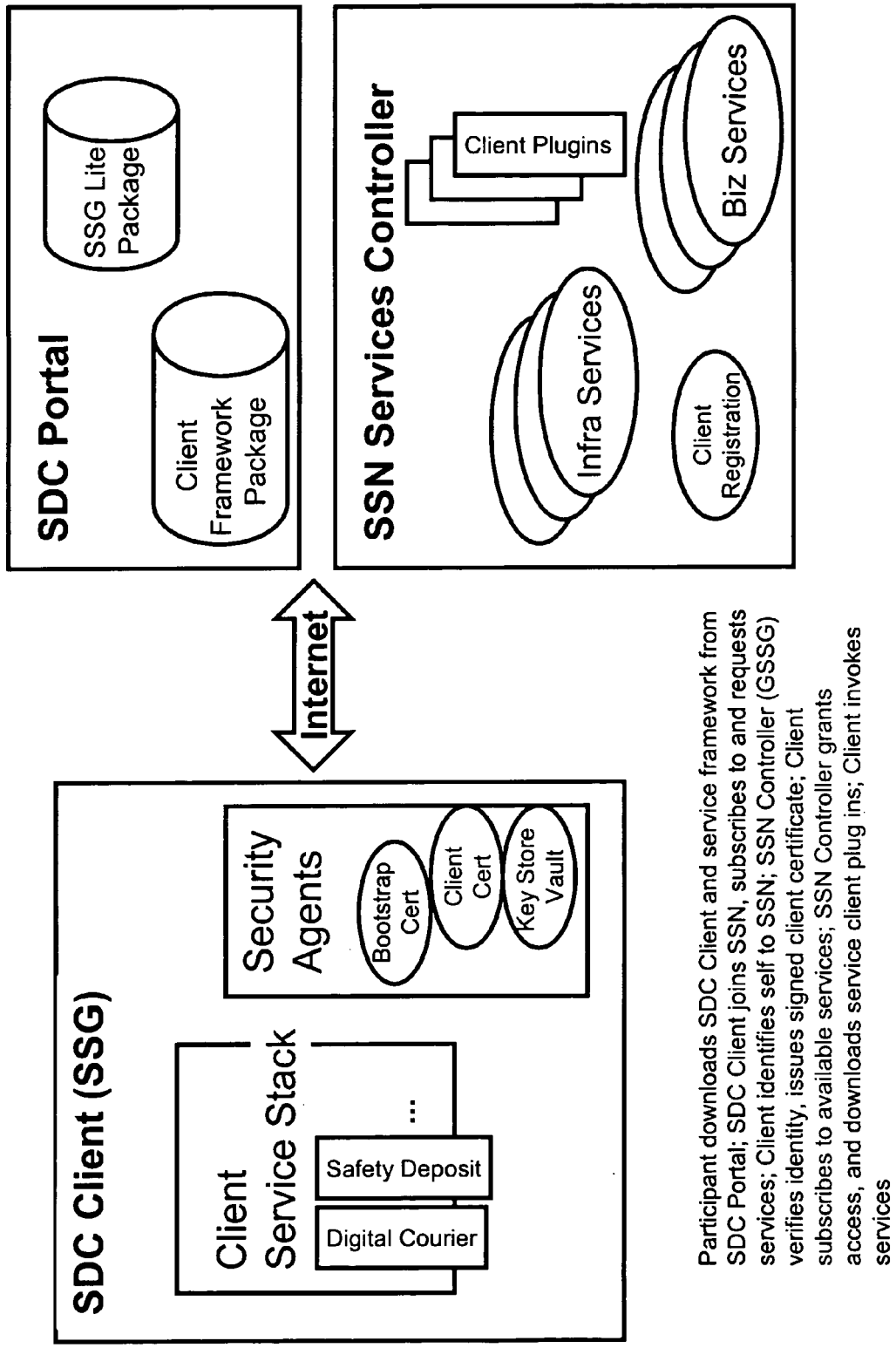
Figure 5: Self Enrollment and Provisioning – SDC Desktop

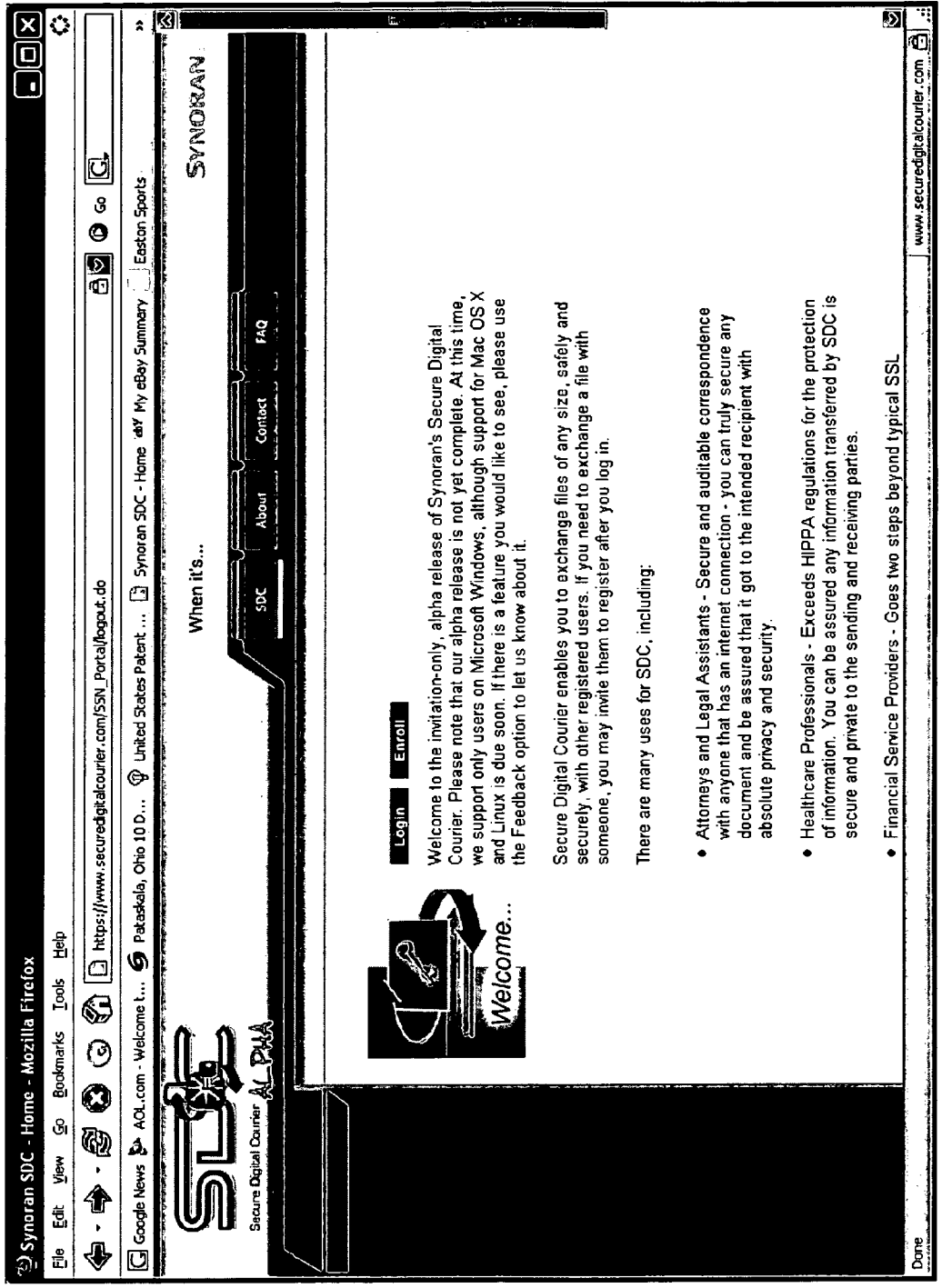
Figure 6: SDC Administration Portal: Login / Enrollment

Figure 7: SDC Administration Portal: Status
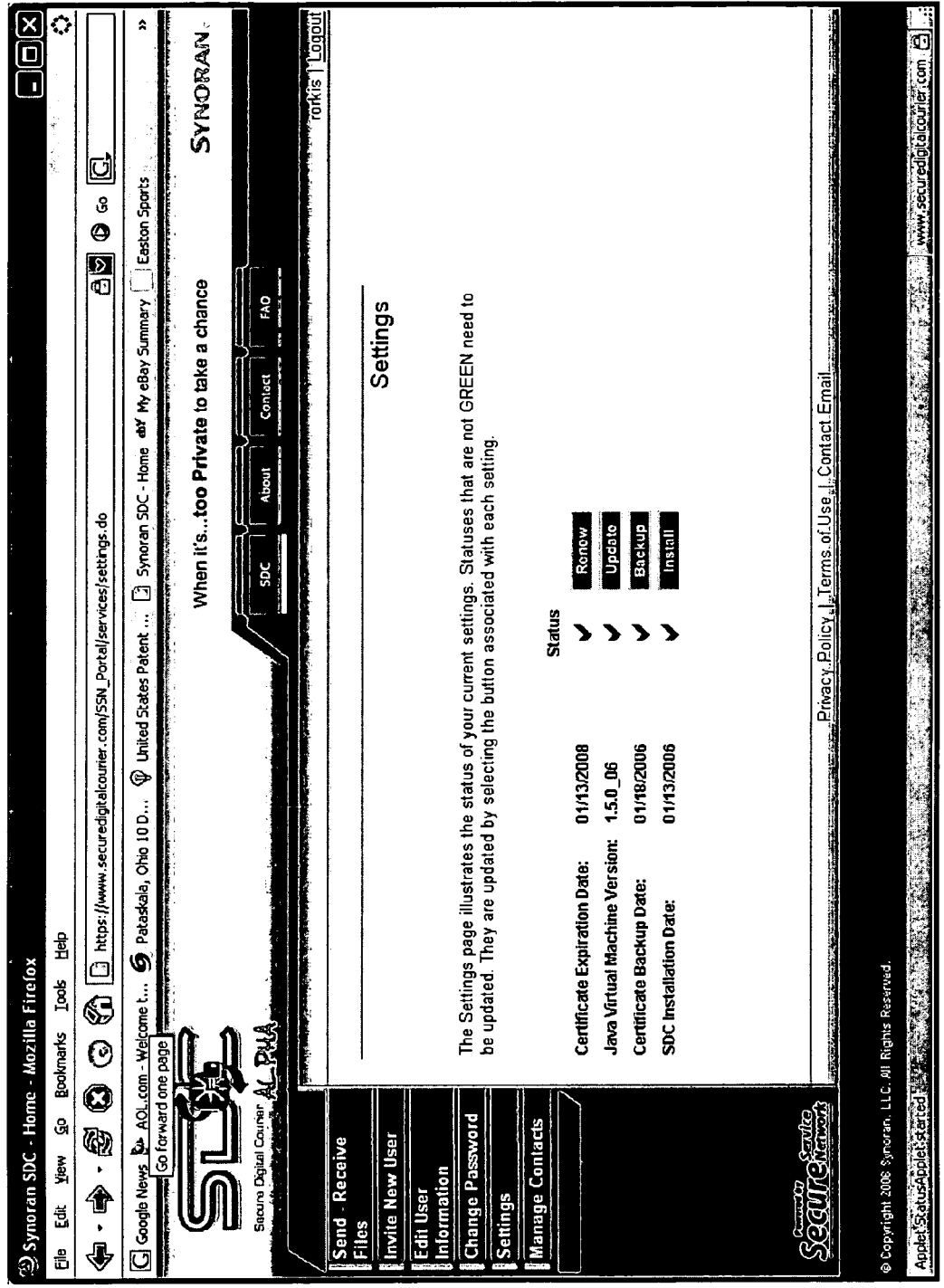

Figure 8: SDC Administration Portal – Invitation Screen
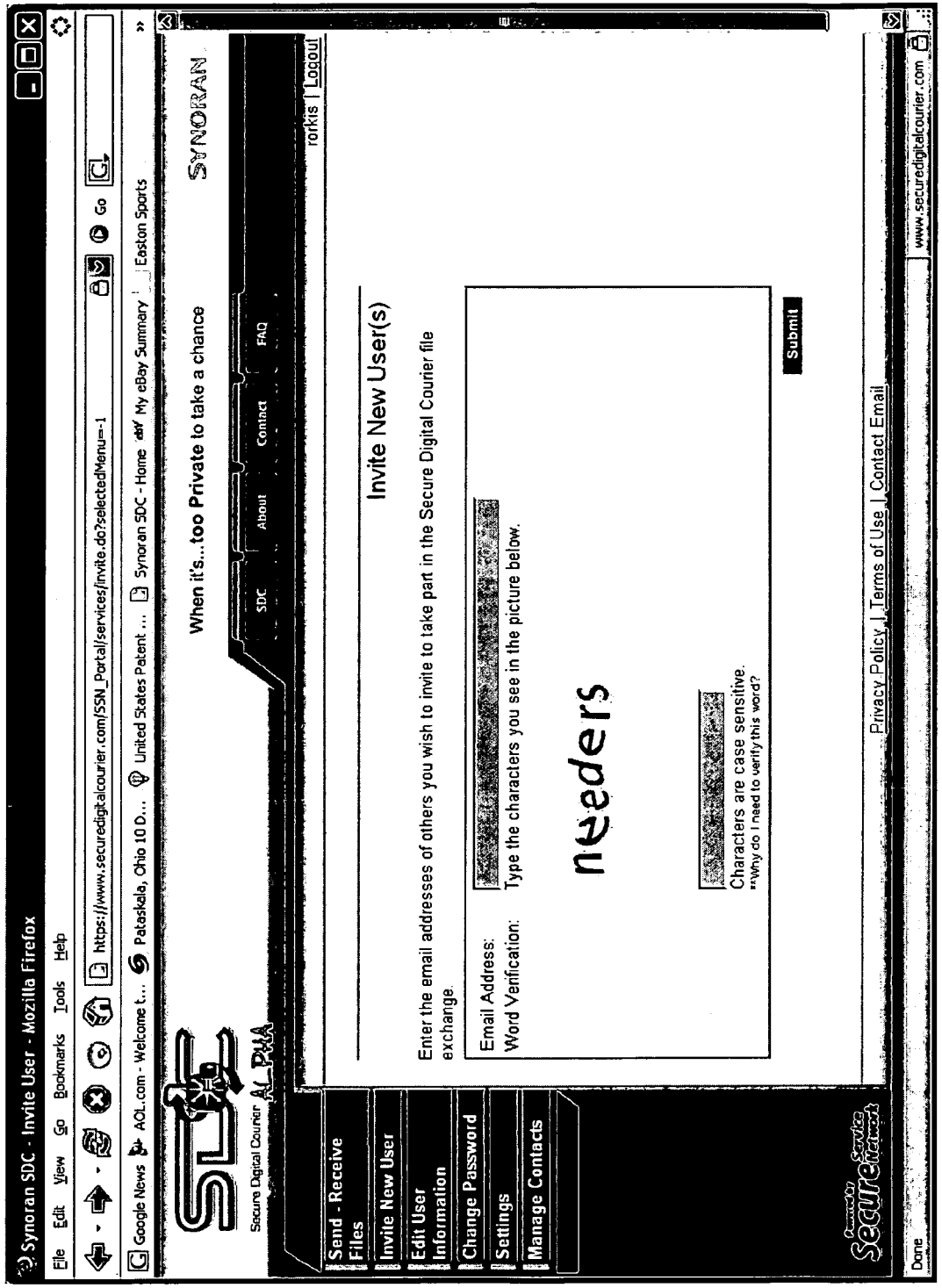

Figure 9: SDC Enrollment Invitation – Sample Private Party Invitation
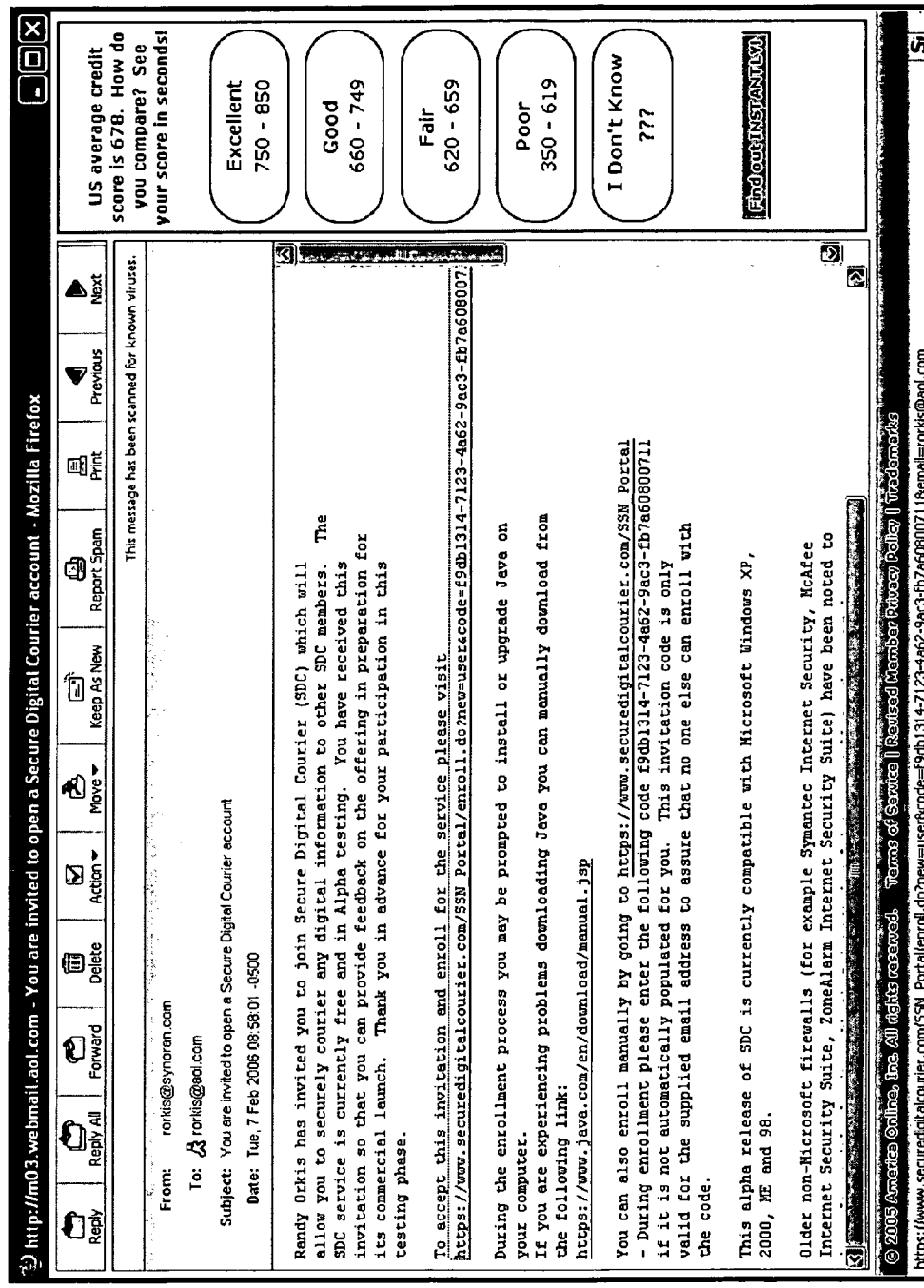

Figure 10: SDC Administration Portal – Invitation Enrollment Screen

Figure 11: SDC Administration Portal: Participant Contact Management Screen
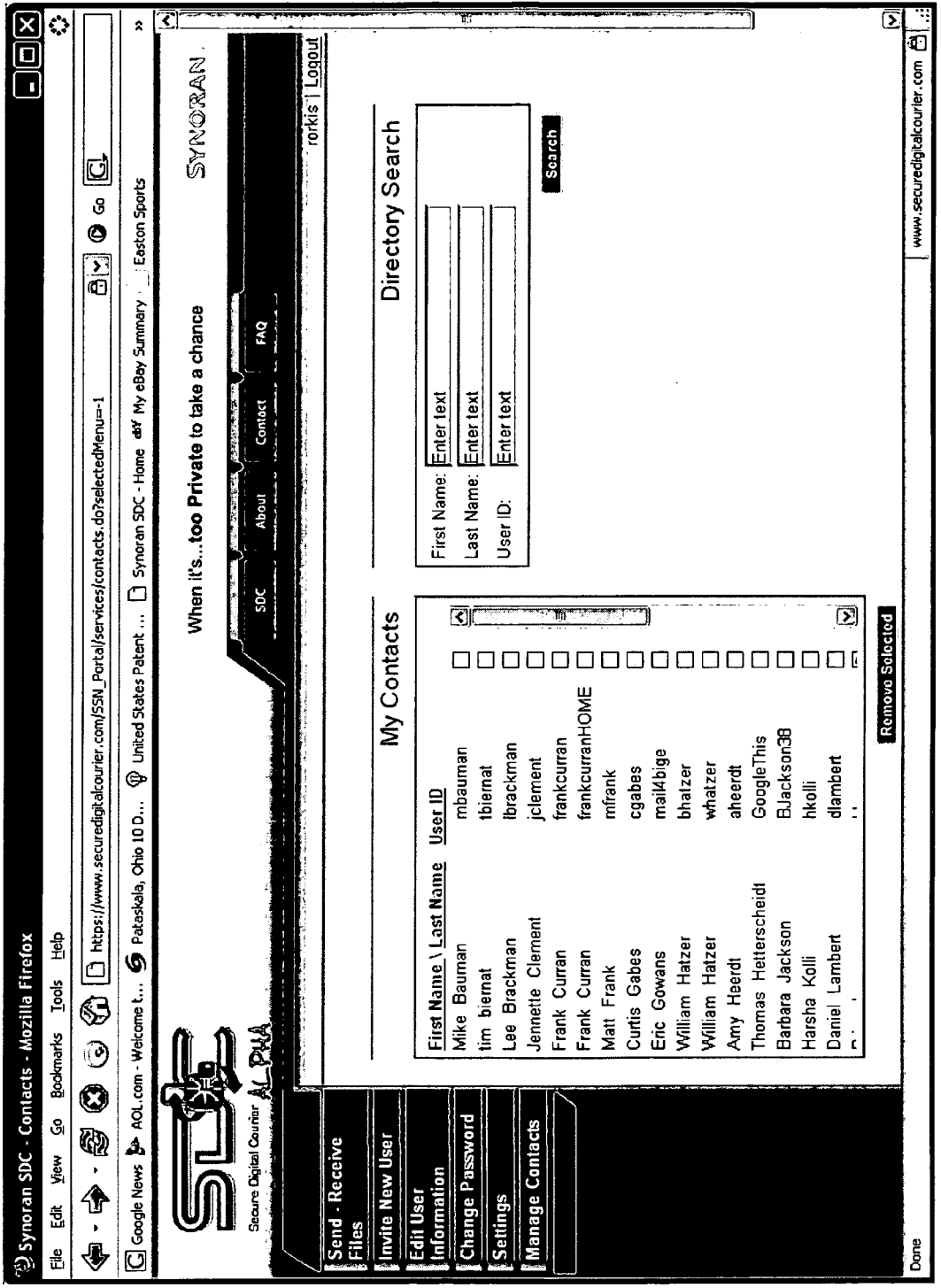

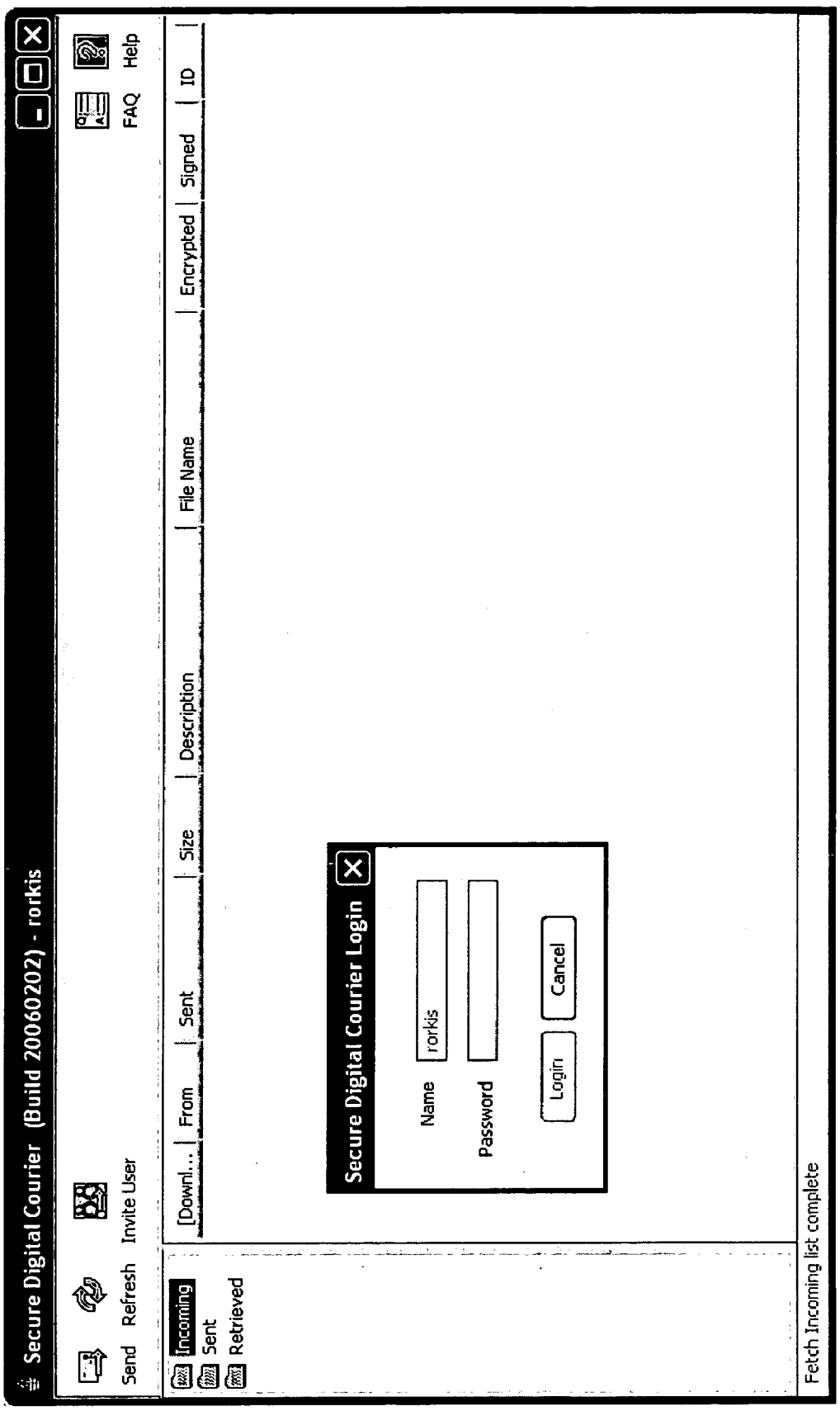
Figure 12: SDC Client Incoming Courier Materials / Login

Figure 13: SDC Client Sent View

Figure 14: SDC Client Retrieved View

| [Lau...] | [Del...] | From | Sent | Retrieved | S... | Description | File Name | Encr... | Signed | ID |
|---|---|---|---|---|---|---|---|---|---|---|
| 🔲 | | rorkisHome | 2006-02-03 19... | 2006-02-03 19... | 284... | test from new clien... | Apollo13Launch.gif | | ✓ | 327 |
| 🔲 | 🗑 | JWAGNER | 2006-02-02 11... | 2006-02-02 11... | 39... | file closed 11:22 | SSN Carve Out.xls | | | 318 |
| 🔲 | 🗑 | JWAGNER | 2006-02-02 11... | 2006-02-02 11... | 39... | | SSN Carve Out.xls | | | 319 |
| 🔲 | 🗑 | JWAGNER | 2006-02-02 11... | 2006-02-02 11... | 39... | file open 11:21 | SSN Carve Out.xls | | | 317 |
| 🔲 | 🗑 | JWAGNER | 2006-02-02 09... | 2006-02-02 09... | 39... | file open | SSN Carve Out.xls | | | 315 |
| 🔲 | 🗑 | JWAGNER | 2006-02-02 09... | 2006-02-02 09... | 39... | file closed | SSN Carve Out.xls | | | 314 |
| 🔲 | 🗑 | rorkisTest | 2006-01-25 18... | 2006-02-02 09... | 69... | test image from AO... | Sunset.jpg | | | 284 |
| 🔲 | 🗑 | JWAGNER | 2006-02-02 09... | 2006-01-24 10... | 39... | | SSN Carve Out.xls | | | 312 |
| 🔲 | 🗑 | mbauman | 2006-01-24 09... | 2006-01-24 10... | 5.7... | HGTV_Caulk | Caulk_HomeAndGa... | | | 271 |
| 🔲 | 🗑 | jm50jom01 | 2006-01-20 13... | 2006-01-20 13... | 51... | | Top_tools.pdf | | | 252 |
| 🔲 | 🗑 | rorkisHome | 2006-01-19 21... | 2006-01-20 13... | 75... | test2 | hub_earth_sm.jpg | | | 244 |
| | 🗑 | rorkisHome | 2006-01-18 18... | 2006-01-19 09... | 22 MB | Space_11 | PTA02973.tif | | | 190 |
| 🔲 | 🗑 | rorkisHome | 2006-01-18 19... | 2006-01-19 09... | 4.8... | PLANET BORN | Planet born..tif | | | 193 |
| 🔲 | 🗑 | rorkisHome | 2006-01-19 07... | 2006-01-19 09... | 1.4... | | New Solar SystemH... | | | 199 |
| 🔲 | 🗑 | rorkisHome | 2006-01-19 07... | 2006-01-19 09... | 37... | | ig193_mir_atlantis.jpg | | | 201 |
| 🔲 | 🗑 | rorkisHome | 2006-01-19 07... | 2006-01-19 09... | 75... | | hub_earth_sm.jpg | | | 200 |
| 🔲 | 🗑 | mzoellner | 2006-01-18 12... | 2006-01-18 12... | 207... | just a test to see it... | Synoran eBX Briefin... | | | 175 |
| 🔲 | 🗑 | mlewinter | 2006-01-17 20... | 2006-01-17 21... | 1.5... | a dummy file | Synoran SSN - Solu... | | | 151 |
| 🔲 | 🗑 | whatzer | 2006-01-17 20... | 2006-01-17 21... | 81... | | Water lilies.jpg | | | 152 |
| 🔲 | 🗑 | rorkisHome | 2006-01-17 20... | 2006-01-17 21... | 1.1... | | DSCN6292.JPG | | | 154 |
| 🔲 | 🗑 | rorkisHome | 2006-01-17 20... | 2006-01-17 21... | 1.1... | | DSCN6343.JPG | | | 156 |
| 🔲 | 🗑 | rorkisHome | 2006-01-17 20... | 2006-01-17 21... | 1.1... | | DSCN6336.JPG | | | 155 |

Fetch Retrieved list complete

Figure 15: SDC Notification – Couriered Material is Waiting to be Picked Up
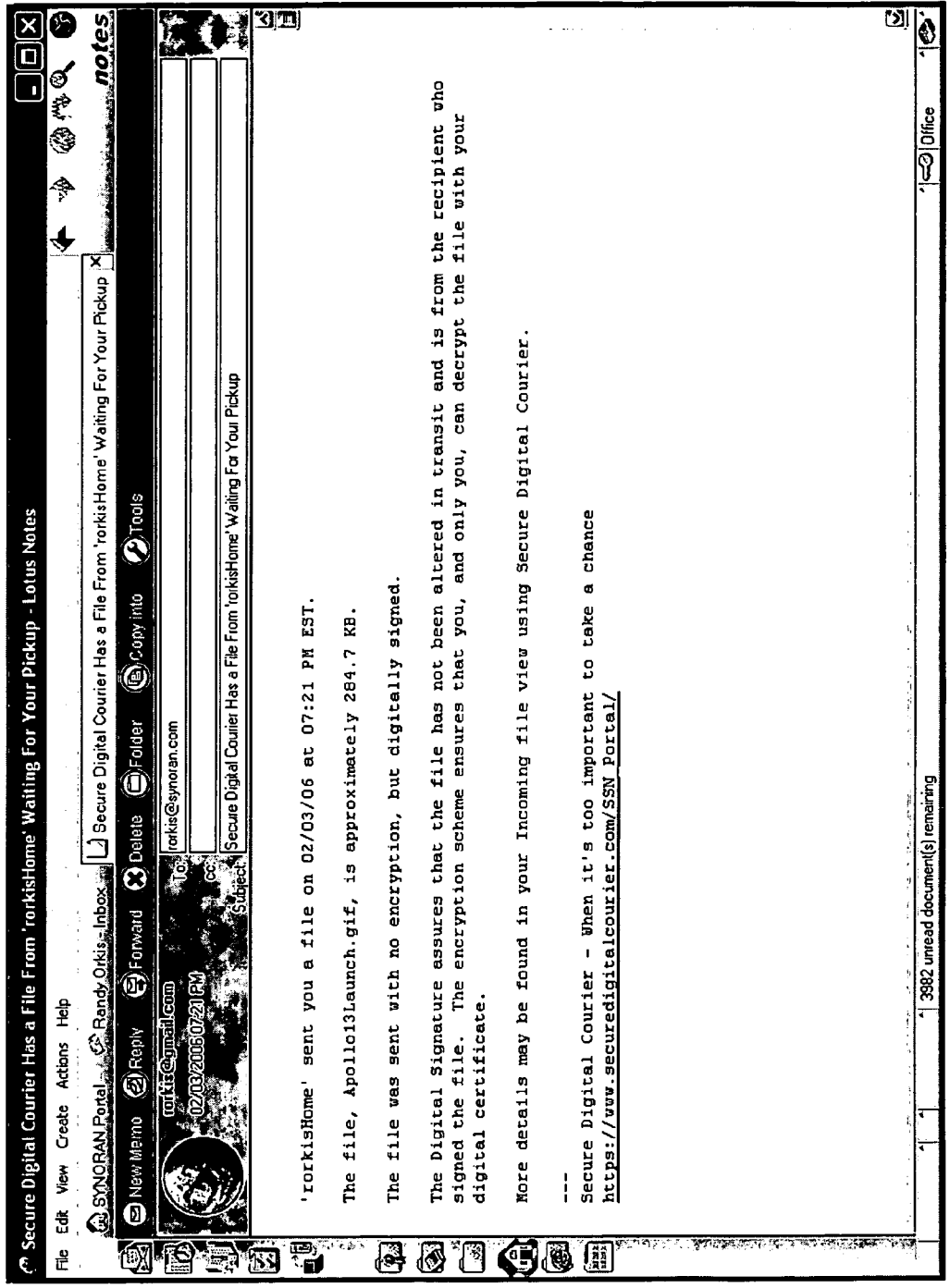

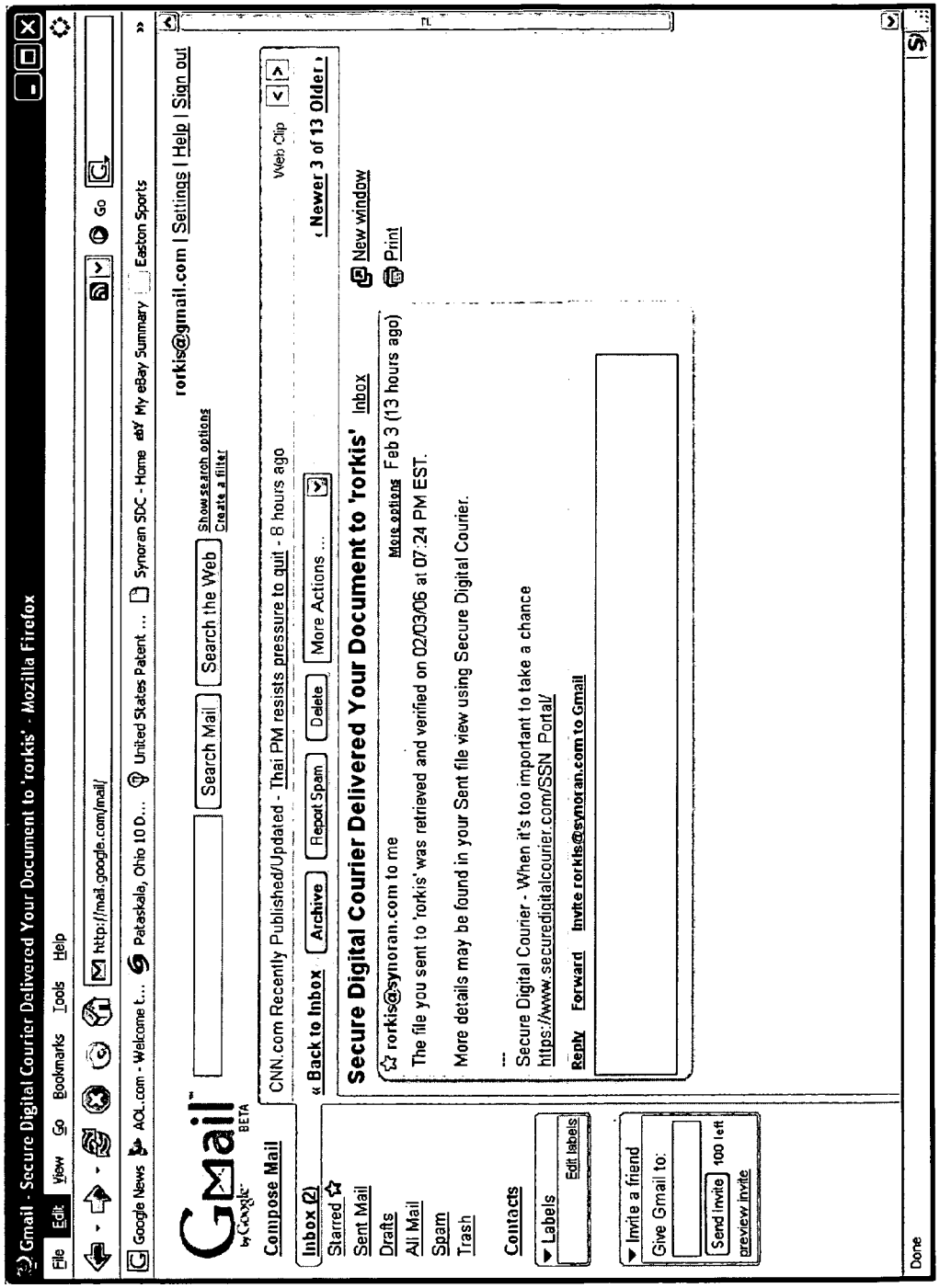
Figure 16: Sample SDC Notification – Couriered Material Has Been Confirmed Received by Recipient Figure 17: SDC Enrollment Acceptance Notification
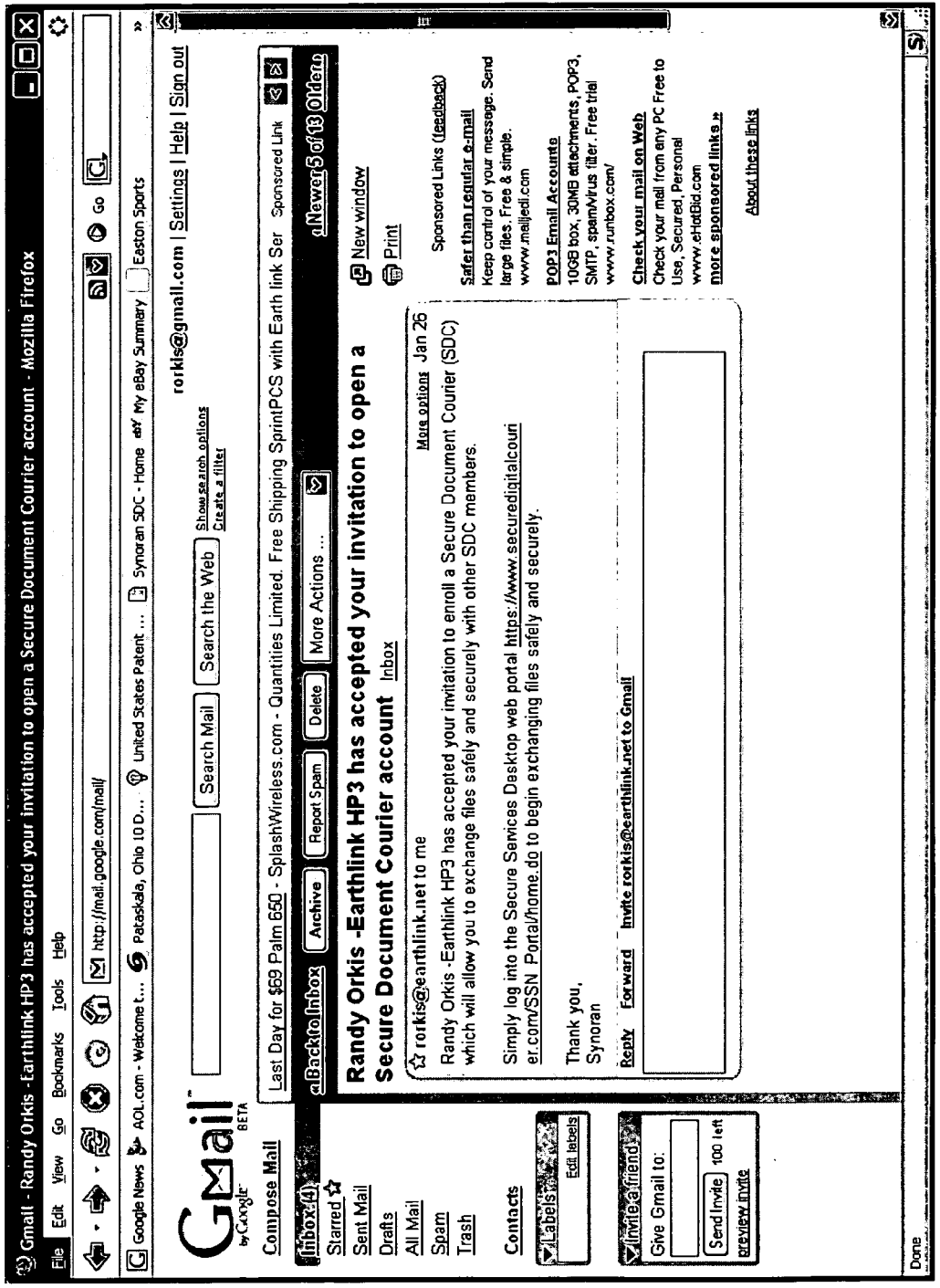

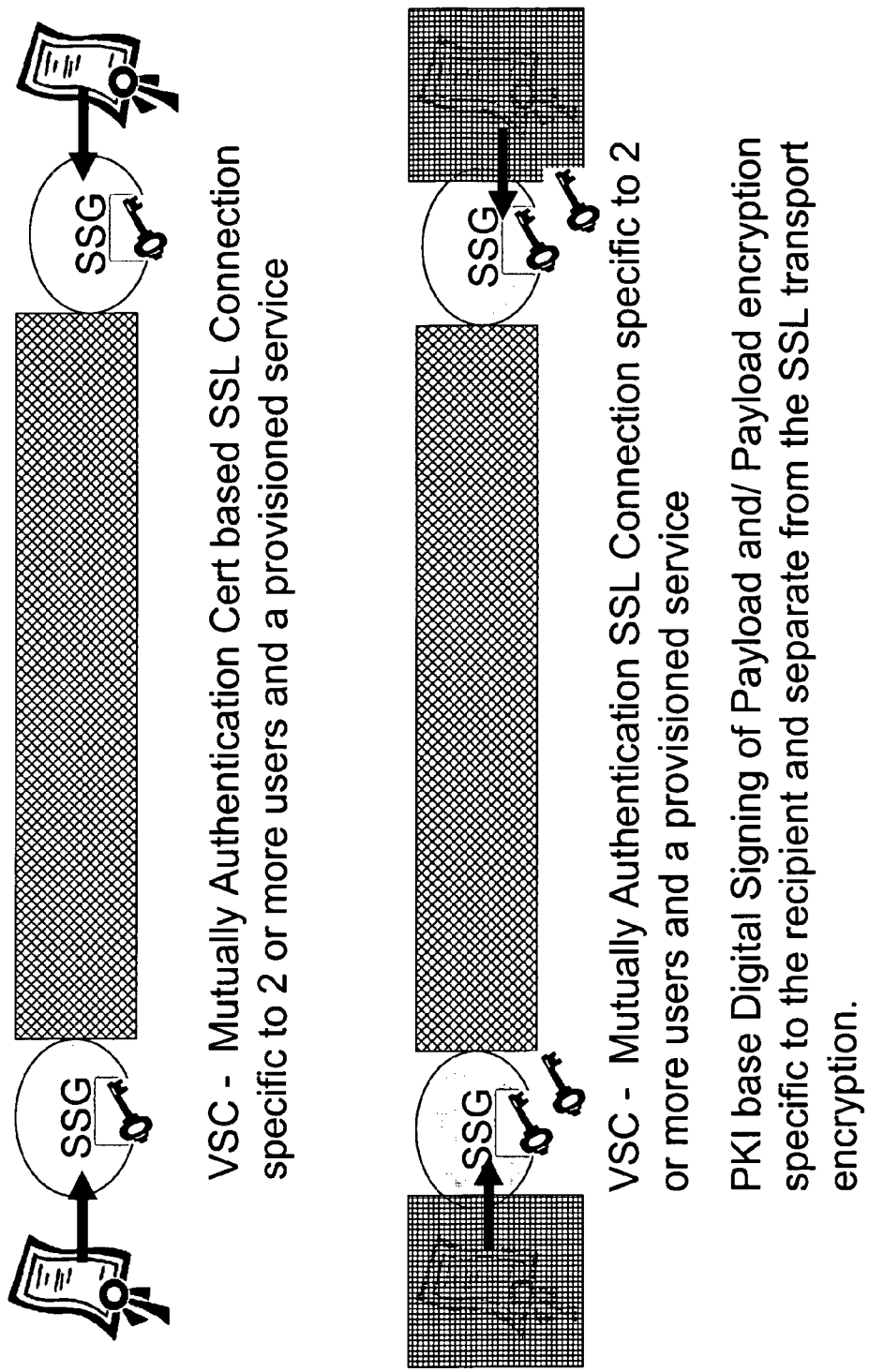
Figure 18: Layers of Encryption and Security based on sample SSL, Digital Certificate, and PKI model

METHOD FOR CREATING AND MANAGING SECURE SERVICE COMMUNITIES

RELATED APPLICATIONS

This application is a continuation in part of our co-pending applications: Dialect Independent Multi Dimensional Integrator Using A Normalized Language Platform And Secure Controlled Access, Ser. No. 10/283,038, Oct. 25, 2002, Standardized Transmission and Exchange of Data with Security and Non-Repudiation Functions, Ser. No. 10/459,694, Jun. 11, 2003; Quality Assured Secure and Coordinated Transmission of Separate Image and Data Records Representing a Transaction, Ser. No. 10/823,442, Aug. 12, 2004; End To End Check Processing From Capture To Settlement With Security And Quality Assurance, Ser. No. 10/846,114, May 15, 2004 now abandoned; Secure Service Network and User Gateway, Ser. No. 10/967,991, Oct. 19, 2004; Secure Network Gateway, Ser. No. 11/154,033, Jun. 15, 2005; A Carrier Independent Multipurpose Network with an Embedded Secure Services Layer that Established a Business and Security Infrastructure as an Integral Part of the Network, Ser. No. 60/679,295, May 9, 2005; Service Oriented Network Managed Service Infrastructure and Process Model for Secure Networked Communications with Peer to Peer Functionality, Provisional 60/694,456, Dec. 9, 2005; Secure Multi Function Network for Point of Sale Transactions, Ser. No. 11/298,121, Jan. 23, 2006; Common Authentication Service for Network Connected Applications, Devices, Users, and Web Services, Ser. No. 11/337,394, Jan. 23, 2006. The above identified applications are incorporated by reference as if set out in full herein.

BACKGROUND AND SUMMARY OF THE INVENTION

The above applications relate generally to comprehensive security around the sharing of digital information in a networked environment where end to end security, reporting, and compliance are necessary in order to counter threats to data and privacy and to meet regulatory and compliance reporting needs. The present invention represents one example of the implementation of a Secure Business Service (Secure Digital Courier) allowing for the transfer of data and files between a wide range of participants over a virtual service connection (VSC) on a service oriented (SON) network. (SON is short for Service Oriented Network also referenced to in previous art as SSN and SMFSN). A core feature of the solution is the ability to create public and private communities of shared secure business services over any IP network. The advantages of such a solution have been described in prior art referenced herein as a Secure Service Network (SSN). The focus of this application is the unique process, security, governance, enrollment, invitation, and service model around a secure digital courier service that is universal in it application and provides a level of integrated security, reporting, management, governance, self enrollment, and logging not presently available.

The solution of the invention allows for the creation of private, trusted, and secure service communities over any physical IP network topology where participant control and end to end reporting, billing, and audit are functions for all activity on the network. This includes the internet, wired and wireless networks as well as vast private and public networks. The ability to create an end to end secure virtual service connection for each and every service and specific to the participants is a unique feature of the invention. This in combination with a series of unique governance models described in previous art and included herein by reference enables the creation of secure and private participant service communities over any IP network.

The ability to share information in a secure, timely, and cost effective manner has become the life blood of nearly every commercial business and government entity. Networks, including the internet and wireless, with their combination of low cost of entry, universal connectivity, and participant flexibility have dramatically impacted the way the world is conducting business. As dependence on these networks grows and the number of participants and applications continues to increase, so does the impact of security breaches and malicious activity.

The proliferation of email, office applications, tablet PCs, PDAs, scanners, RFID systems, the internet, wireless, and vast private corporate networks, make it possible to capture information in digital form and move it from point to point at the speed of light. Unfortunately, the networks and applications created to perform this broad and far reaching distribution have focused mainly on convenience at the expense of other important/critical qualities. As an example, the internet and vast private networks make it possible to move a document/file from one location to another in a matter of seconds. However, major gaps in security, privacy and the ability to insure authenticity are limiting the value of this incredible resource in markets where these features are required. Despite these weaknesses, the use of the Internet and vast private networks continues to grow at an amazing rate and the infrastructure needed to move information in a secure, auditable, and reliable digital format is struggling to keep.

As businesses and economies transition to a digital world, there is a rising need for a comprehensive secure business offering that replicates and expands on the key features of the traditional hard copy Document Courier or Registered Mail in the digital world. We have become accustom to email, instant messaging, FTP, and many other networked conveniences. Many users do not understand that information contained in these communication vehicles has limited or no security wrapped around it. Those that do understand it, continue to use physical documents and couriers to address the need or willingly assume the risk by placing disclaimers and confidential notifications on email messages assuming this provides some level of protection. This physical approach is not only time consuming, but expensive, inconvenient, and ridiculous in today's digital world. The result is that whether the need is over an internal private network or over the internet, the problem of addressing digital document security and authenticity in a simple comprehensive manner is still present. Currently email (using SMTP) over an untrusted network and other forms of file and message transfer can not guarantee the authenticity of the document, its privacy between the sender and receiver, and that it was actually received by the recipient.

The current security market has a signification separation created by the role and capabilities of network equipment makers, network transport providers, and application providers. The result is a fragmented and piecemeal approach to comprehensive security in a networked world. The network perimeter security model is only as strong as the weakest on ramp, has no knowledge of user or context, and has no knowledge of applications. The applications connected to a network have limited knowledge of the network and all implement components of security in varying forms. The result is fragmented and piecemeal security across networked solutions where the risk increases with the number of users or applications on the network.

The solution of the invention is the first offering that bridges the security gap created by this market separation by providing a comprehensive security model for networked applications and users as a function of the network. As a result, all traffic on the service network inherits a comprehensive security, provisioning, and compliance reporting model. A unique feature of the invention is that all applications and web services running over and SSN network inherit this security model with no changes to the existing applications and web services. This allows for rapid adoption and integration to existing investments and eliminates the need and risk of building security into each application and service where the result is your network is only as secure as your weakest application, web service, or network on ramp. The market result of this fragmented approach has been the creation of vast private dedicated networks or application specific networks were one entity maintains absolute control over the network/application, or in the case of internet secure applications, all security is inconsistently implemented in each and every application. The impact has been massive security challenges and public compromises of sensitive data.

Currently there is no integrated security solution that bridges the gap and addresses all of the elements of security needed to enter into and enforce a basic business contract focused on the integrity of sharing information in a digital form. A summary of the basic elements of security needed to provide comprehensive end to end security include: a) Authentication—I must know all participants that I am doing business with (specifically strong mutual and multi-factor authentication); b) Authorization—I know that the participants I am interacting with are authorized for the specific activity they are requesting; c) End to end encryption—the information being exchanged is protected in such a way that it is only viewable to the authenticated and authorized participants. This includes transport level encryption as well as payload encryption such that the data is still protected and private while it is at rest on any device; d) Privacy—keeps private a participant's activity or existence from other participants that are not authorized to have that knowledge and maintains the privacy of any data exchanged such that it is specific to the authorized participants; e) End to end audit—tracks all activity to the user and activity level (service on the network) and provides a record of the activity (who did what to whom and when); f) Reporting—collects and reports data in a manner needed for SLA enforcement, billing, dispute resolution, activity, real time management, and operational provisioning/planning; and g) Non-repudiation—supports that an activity happened and that it is unique to the participants. This feature assures the integrity and authenticity of an action or activity among a group of participants that are parties to the activity.

Some common approaches for moving digital information today and their limitations are highlighted below. Create a PDF document—many businesses and legal firms today create PDF documents so that they can control changes in a document that has been distributed to others. This does little or nothing to protect the content while in transit or at rest, can not assure the document was delivered, and can not provide any level of audit trail showing that the item was sent from one person to another where strong mutual authentication is implemented.

Zip the files up into a password protected Zip file—While this will provide some limited content privacy, it provides no assurance the payload has not been tampered with, it actually came from the sender, the document got to the recipient, and requires you to send the password to the recipient over the same medium and often unprotected. In addition there is no audit trail showing that the item was sent from one person to another and no use of strong authentication.

SSL based file transfer services—only protects the payload in transit. Does nothing to protect the content, such that only the recipient can open, read or alter it. Also does not provide an end to end audit trail for the distribution of the document. In addition, strong mutual authentication of the participants is not common and there is no support for recipient specific encryption.

Secure email—can take many forms and usually requires the same email package by all users. In addition, it typically can not provide a defensible audit trail over an unprotected transport, nor can it protect the payload such that only the recipient can open, read, and alter it. Also typically has attachment and attachment size limits and is not firewall friendly.

Secure FTP—typically uses SSL to encrypt the transmission of files using the traditional FTP method. Limited traceability and has the same limitations of the SSL file transfer approach. Also does not implement a strong mutual authentication of all parties to the transfer or other components of comprehensive end to end security.

Email attachments—Does nothing to protect the file. Limits in attachment size and type often restrict use through corporate firewalls and emails servers. The payload is open for viewing to anyone that can see the data packets on the network. Using SSL for transport encryption still does not full fill the need for recipient specific encryption in support of end to end non-repudiation for high value transfers.

Email attachments with encryption—Protects the payload but does not utilize an SSL connection for transmission of data. As a result elements of the information sharing process are not secure resulting in opportunities for compromising the protected portion of the activity. This approach also does not provide privacy protection for the parties to the transaction.

Instant Message File Transfer—Sends file in the clear and does not support recipient specific encryption. Also has file size limitation and if encrypted suffers from the same limitations as the SSL file transfer approach.

There are several solutions in the market today that provide an encrypted file transfer service using SSL. However, none of these can encrypt the document in a manner that guarantees who it is from and that it's content has not been tampered with, protects the document when not in transit (at rest), all while assuring that it can only be opened and viewed by the recipient. Also none of the SSL approaches leverage a PKI infrastructure for mutual authentication as a requirement for establishing the SSL session. There are secure email packages emerging on the market. However these still do not have the secure and far reaching capabilities of the Secure Digital Courier subscription model outlined in this document. These solutions focus on SSL encryption for the movement of the message, are limited in the size of the documents they can move, and do not perform automated encryption and security at multiple levels specific to the recipient or participants in the transaction.

In summary, the SDC service addresses the limitations of alternatives in the market and offers: a) A unique process model around private invitation enrollment with strong authentication and verification; b) Integrated reporting, SLA management, and activity notifications; c) Receipt verification with status of digital signature verification and recipient specific encryption verification; d) Comprehensive security around all interactions with the solution and the ability to support private, public and interest specific secure communities; e) Enrollment acceptance notification; and f) Function specific secure network connections defined as Virtual Service Connections where an encrypted VPN is created specific to the services and it's provisioning to participants.

The invention is described more fully in the following description of the embodiments set out considered in view of the drawings in which:

BRIEF DESCRIPTION OF THE DRAWINGS

FIG. 1 represents a diagram of an SSN solution running the Secure Digital Courier service.

FIG. 2 provides a description of the traditional network and application configuration commonly used in today's network model where applications, security and network functionality are all tightly tied to discrete physical instances of each.

FIG. 3 outlines the virtual service network topology that the solution of the invention enables on any traditional network and application configuration.

FIG. 4 provides examples of SSG (SDC) configurations to support large corporate gateways down to individual users on PCs, laptops, wireless devices . . . etc.

FIG. 5 provides a diagram of the self enrollment process used to install, register and enroll new participants in the SDC service.

FIG. 6 provides one example of the SDC administration portal Status View.

FIG. 7 is a view of a SDC Administration Portal Status Screen.

FIG. 8 is an SDC Administration Portal Screen showing the unique private invitation process supported by the solution of the invention.

FIG. 9 provides an example of the SDC private invitation notification that is sent out as a result one of the invitation processes supported by the invention.

FIG. 10 depicts the enrollment screen for one specific private invitation process for invitation only enrollment.

FIG. 11 illustrates a unique feature of the invention allowing its ability to manage the PKI lifecycle around any number of private communities of users.

FIG. 12 is a view of the SDC client running the SDC service

FIG. 13 is a view of the SDC client running the SDC service in the Sent view.

FIG. 14 is a view of the SDC client running the SDC service in the Retrieved view.

FIG. 15 is an example of the notification that is sent to users alerting them that they have couriered material to be picked up.

FIG. 16 is an example of the SDC delivered Notification that is sent to users alerting them that the material has been received by the intended recipient.

FIG. 17 is an example of the SDC enrollment acceptance notification sent when an invitation results in user enrollment.

FIG. 18 provides a visual representation of the encryption supported by the invention. In standard mode the solution established mutually authentication SSL VSCs where the transport is encrypted and identity for authentication and authorization is extracted from the digital certificate of the participant.

DETAILED DESCRIPTION OF THE INVENTION

The invention satisfies a need for a secure digital courier service that provides end to end security and audit ability for high value, high importance documents and files that can be exchanged over any network connection where the service makes any network connection secure for the duration of the transfer and protects the contents of the courier such that it can only be viewed by the intended recipient where end to end reporting, notification, participation by keyed invite, and participant privacy are features of the solution and implementation architecture. In addition, a self service enrollment model with strong authentication is a function of one operating mode that promotes the creation of broad communities with a level of security not previously achieved.

The service described herein is a digital courier service that is secure, private, auditable, and has a way to insure authenticity at a fraction of the current price of hard copy couriers, all with enhanced security, adaptability, and compliance reporting over that provided by other digital solutions. Currently there is no solution that offers the unique mix of security, audit ability, enrollment, provisioning, management, governance, and ease of use offered by the SSN based secure digital courier (SDC) service described herein. The solution of the invention is one of a series of secure services riding on secure Service Oriented Network (SON) model of which implementations have been described in prior applications, included herein by reference, under the terms Secure Service Network (SSN) and Shared Multi-Function Service Network (SMFSN). SDC is implemented by the digital architecture described herein and supports the secure movement of digital data between participants of the service or participants on any SSN implementation. SDC does this in a way that ensures all elements of security needed to enforce a business contract are implemented for all service (couriered) activity.

SDC includes three major components, only two of which are required for the SDC service offering. The third component, the SDK, is provided as a method for expanding the SDC solution into a secure services digital marketplace for services, service brokers, and participants to include large corporations, B to B, down to the individual user on wired, wireless and portable devices in a B to C, and C to C model. The components are: a) SDC Client (Secure Service Desktop/Secure Service Gateway): A web downloadable Java Application that runs on any device that supports Java. The SDC client is a version of the SSG described in prior art configured to run the SDC service; b) Hosted Global Service Controller: A data center implementation of the SSN Global Secure Services Gateway (described in prior and included herein by reference) that is hosted in a data center offering services over the internet or any network. This component manages the provisioning of services, PKI management, governance, enrollment, billing, service repository, receipts, history, notifications, activity reporting, activity logging, accounts . . . etc. for any SSN service implementation. In the case of the SDC service, it provides the SDC Portal to allow for implementation and management of the solution as well as the infrastructure to add new services and web apps as needed; and c) Service Creation SDK: A web services compliant SDK that allows for the rapid creation and testing of new SSN services for deployment to a group of participants.

The invention is a Virtual Secure Service Oriented Network (SON) for the creation and management of secure service communities including (a) a private Secure Digital Courier (SDC) Service means for the secure and auditable movement of digital information over any network connection, (b) means for providing end to end security, (c) means for reporting activity within the SDC, (d) a controlled enrollment means, and (e) strong authentication means whereby the creation of a secure service community and the provisioning of additional users and/or services to new or existing service communities is effected. Security is provided for all network activity and network participants through: (a) Mutual authentication for all service activity and VSC creation for all parties to a service use; (b) Authorization specific to a service and service relationship to a participants is controlled by the provider of the service; (c) Transport encryption using mutually authenticated Secure Sockets Layer (SSL) or equivalent approach where all parties to the network connection are authentication prior to the delivery of a service; (d) End to end reporting using a unique service ID for each activity that links authentication, authorization, usage, and encryption for all parties specific to the instance of the activity; (f) Participant privacy on a service to participant relationship basis; (g) Digital encryption of the payload or service content independent of the transport and specific to the recipient or parties of a service invocation and independent of the transport encryption. Digital signing of payload or service content, independent of the transport encryption and specific to the recipient or parties to an instance of use of a service, is effected as well as a) digital encryption of the payload or service content independent of the transport encryption and specific to the recipient or parties to an instance of use of a service and b) digital signing and digital encryption of the payload or service content independent of the transport encryption and specific to the recipient or parties to an instance of use of a service. Payload encryption means allow for the protection of the payload while at rest within any fixed or mobile storage device such that only a predesignated participant to a transaction can decrypt the contents. A service may be a networked web service, a networked function within an application, or a networked application.

Means for establishing transitive security include combined elements of security provided elements of the VSC and specific control of a participant is effected by means of local ACL control by a service provider such that the provider maintains absolute control over services independent of any other participant on a public or private implementation of the service network or service community. A portable indicia of a participant's identity on a service network is provided via a digital certificate, a token, a biometric characteristic, or secret employed in combination with a Common Authentication Service and Authentication Library accessed over the network.

Enrollment of participants in the network is controlled to effect strong participant authentication by service, service community, or participant grouping and consists of means for effecting strong authentication by invitation only which may be correlated to network enrollment through one or more unique artifacts associated with the invitation and/or the relationship between the parties to the invitation. Participants or service providers create private secure service communities as an element of the invitation and enrollment process.

Out of band or in band notification of service activity over the network is included. Strong authentication includes a Common Authentication Service on the network. Uses include the transmission of payment information which may be digital checks, micro payments, ACH, wire transfers, account credits, and account debits. An XML digital certificate authentication is a function of a service over an instance of a service network.

Security Access Markup Language (SAML) is used as an authentication service accessing one or more identity servers managed by participants on the service network wherein access to the identity servers is via a service on the network. A software node may be self provisioned on the network to register the node on the network. Strong authentication is effected through the use of more than one set of digital certificates where one or more certificate authorities is associated with each set of digital certificates and a service on the network is used to validate each certificate with the respective issuer and/or signer of the certificate. Strong authorization is also effected through the use of more than one set of digital certificates where one or more certificate authorities is associated with each set of digital certificates wherein a service on the network is used to validate each certificate with the respective issuer and/or signer of the certificate. Multiple levels of encryption are effected through the use of more than one set of digital certificates wherein one or more certificate authorities is associated with each set of digital certificates and a service on the network is used to validate each certificate with the respective issuer and/or signer of the certificate. Transitive security is provided for all services and participants on a service oriented network; Web Services Security (WS-S standard) is used to effect components of security for the authentication, authorization, and/or encryption of web services over a service oriented network; and a service on the network validates a digital certificate or equivalent artifact in the service wrapper or payload transmitted by a participant prior to passing the service onto another participant on the network. Data compression may be effected in cooperation with payload and/or transport encryption.

In a SON, a Public Key Infrastructure (PKI) based container is created around the payload that includes one or more of functions of an SON and the payload is encrypted via a CPU method allowing for increased performance for large payloads over that available using a convention PKI approach for the entire payload. A PKI based container may be created around the payload wherein the payload is compressed and protected inside the PKI based container allowing for increased performance with the same level of security for large payloads over that available by using a convention PKI approach for the entire payload. End to end security is implemented and enforced independent of the service where all services inherit a base but comprehensive security model with no programmatic changes required to the service, or alternately all services inherit a base but comprehensive security model with no programmatic changes required to the service allowing the service to implement additional security to effect service and participant specific security.

With reference tom the drawing figures, FIG. 1 diagrams an SSN solution running the Secure Digital Courier service. SDC clients are SSGs configured to support the SDC service. The SSN controller node (GSSG in previous art) provides the management reporting, security and service hosting for the SDC service. The SSN controller node includes a unique portal that allows for automated self enrollment with strong self service authentication. The SDC clients manage local security and in combination with the Controller take care of the security needed to establish, manage, provision, and log activity among any group of participants. A unique feature of this solution is the ability of the SDC clients to run additional services using a common but service and participant specific security model. This combined with the ability to create private communities of users allows for the rapid creation of private multi service communities over any network is unique to the invention.

FIG. 2 describes the traditional network and application configuration commonly used in today's network model where applications, security and network functionality are all tightly tied to discrete physical instances of each. This figure reveals the fragmented piecemeal approach to security in the market. Pieces of security are implemented in Applications, routers, IP addressing schemes, and firewalls with no integrated and comprehensive model. The result is the network is only as secure as the weakest on ramp or worst application attached to it. In addition, end to end security is complicated, expensive to manage, and nearly impossible to administer and report on in a large network using the approaches common today.

FIG. 3 outlines the virtual service network topology that the solution of the invention enables on any traditional network and application configuration. The solution runs on top of any IP network where it establishes a secure virtual network topology where services are managed in discrete virtual service connections outlined by layer 2 in the drawing and in prior art. Layer 2 depicts the infrastructure and security layer implemented by the solution. Virtual Service Connections are created and managed for services and specific to a service and provisioned participant relationship. This allows all services and participants to maintain separate service communications and privacy over the network as well as consistent and comprehensive security that is not dependent on being built into the service or an existing application. As a result, unlimited participant defined and controlled secure virtual service communities can be created over any IP network. Examples of services are identified in layer 3 of FIG. 3. A unique feature of the solution is its ability to manage the secure provisioning, consumption and compliance reporting for all services running on the network. Services can be web services or existing applications run through SSN as a service. As a result, the solution enables the implementation of consistent and comprehensive security, SLA reporting, provisioning, and billing independent of the application or web service that is provisioned through SSN.

FIG. 4 provides examples of SSG (SDC) configurations to support large corporate gateways down to individual users on PCs, laptops, wireless devices . . . etc. This allows the solution to be used in many configurations across any IP network connection. Examples include a large corporate gateway, a small DSL or cable router in a remote office or home user, a PC installation in an office or home user, and wireless smart phone user where the SDC client is installed on the user device. In one configuration software agents can be run on existing devices allowing those devices to participate securely over any SSN implementation they are registered to. Registration can be to one or more SSGs or GSSGs.

FIG. 5 provides a diagram of the self enrollment process used to install, register and enroll new participants in the SDC service. This process can also be applied to any service on SSN. Components include the SDC client, the SDC portal, and the SSN services controller. In previous art these items were referred to as a Secure Service Gateway (SSG), the SSN administration Portal, and the Global Secure Service Gateway (GSSG). Examples of infrastructure services include CRL, ACL, logging, OSCP (online certificate status protocol), and directory services. These infrastructure services are available to all business services on the network and a minimum set around security and reporting is enforced for all users to assure a minimum and comprehensive end to end security model for all activity on the network.

FIG. 6 provides one example of the SDC administration portal Status View. General features of the portal include the ability to send and receive couriered items, invite new users, edit your user information, change your password, system settings, manage contacts and private/public groups. In this view the user can see and assess the status of their SDC client and related service features. All interaction with the portal is secured via a minimal of SSL encryption. Once enrolled all SSL connections include mutual authentication based on a PKI mutual authentication process. This approach to authentication assures that all parties to a service activity are accurately identified and eliminates the common web site spoofing attack. There are two base options available from this screen that includes enrollment and login. Enrollment can be controlled through a variety of restrictions including a private invitation process or an external system invitation process allowing participants to create any number of secure and private service communities.

FIG. 7 is a view of a SDC Administration Portal Status Screen. A unique feature of the solution is its ability to manage the status of the SDC client and the related business and infrastructure services over an SSN implementation independent of the services. Reporting includes status of one or more of the participant's digital certificates, status of the JVM running on the client device, Certificate backup status, and SDC installation date. The ability of the solution to manage the PKI lifecycle across a community of diverse user communities where the participants maintain absolute control over their services independent of anyone other participant is a unique feature of the solution.

FIG. 8 is an SDC Administration Portal Screen showing the unique private invitation process supported by the solution of the invention. Existing participants can invite new participants. In this example an existing user enters the email of that the invitation will be sent to. This email address is linked to a unique invitation code that is included in an invitation email sent to the new user. The new user receives the invitation email that includes information about the service, self enrollment process, and the person that made the invitation. This allows for the creation of private groups and communities by any user and independent of any other user except for the one that invited you. The SDC service implementation uses CAPTCHA to assist in preventing a user from writing a program that automatically generates invitations or SDC accounts. CAPTCHA stands for "Completely Automated Public Turing Test to Tell Computers and Humans Apart." This requires the user to actually interpret the word and enter it into the space. In an alternate enrollment model, the automated addition of users is supported though a Web Service to provide a programmatic and secure partner way to add users to the system. The web service for partner enrollment can also be a service running over the solution enforcing the same security and reporting model.

FIG. 9 provides an example of the SDC private invitation notification that is sent out as a result one of the invitation processes supported by the invention. The invitation includes a user email address, enrollment URL, as well as a specific invitation code that is tied to this email address. An optional relationship specific authentication challenge process where the challenge is specified by the participant making the invitation can be included. This approach provides a level of assurance that the invitation is only useful to the intended recipient. Note the email address and the unique invitation code included in the message. Both components are needed for enrollment. Additional elements can be added to assure user authentication. A relationship specific challenge question is just one example.

Figure 10:
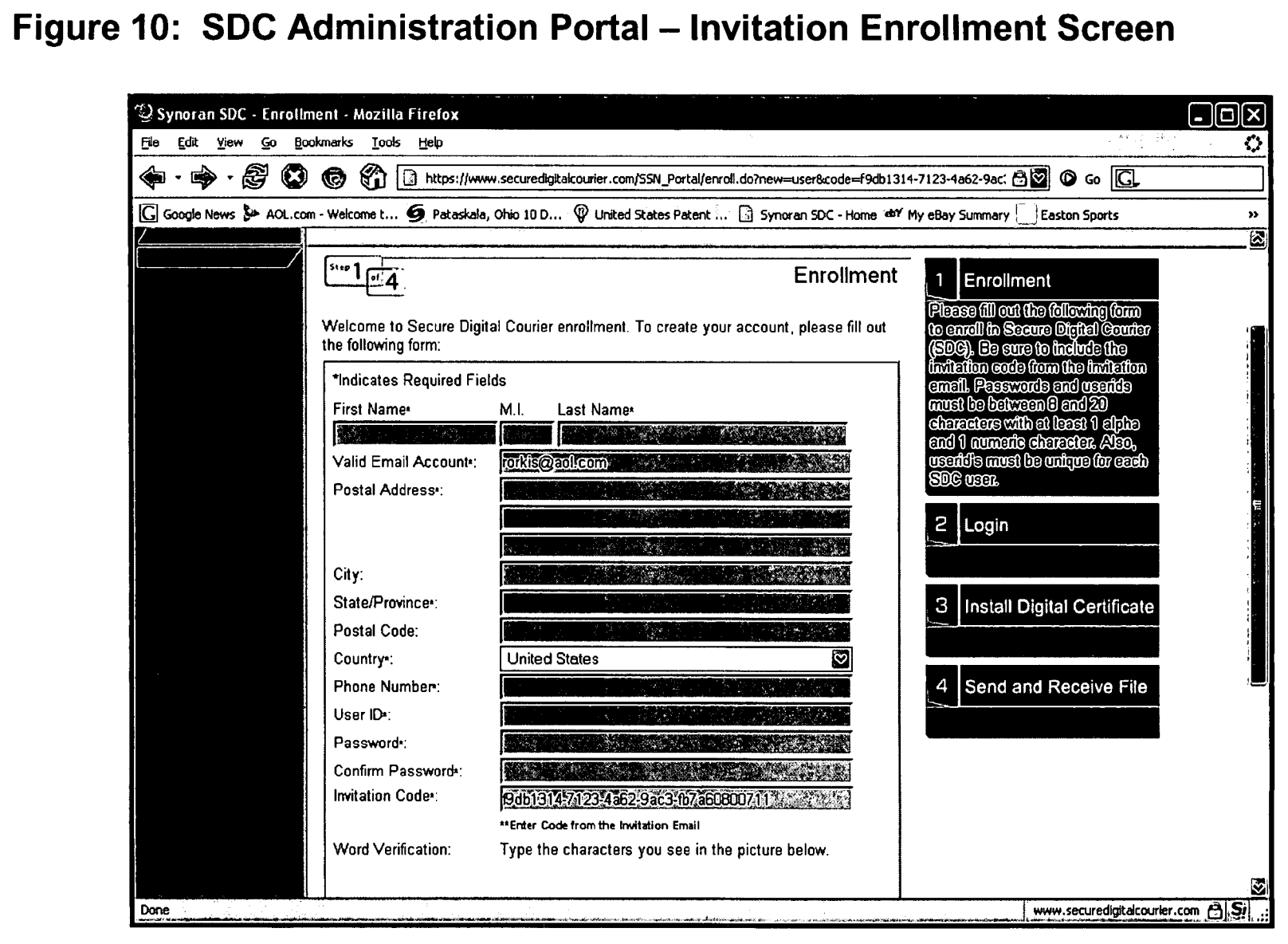

FIG. 10 depicts the enrollment screen for one specific private invitation process for invitation only enrollment. All communications except for email notifications are encrypted to protect customer information and privacy. In addition, all communication with the portal is via SSL leveraging one or more certificates and user credentials. Once enrolled, all communications requires mutual authentication leveraging the signed and validated credential provided by the solution. This counters common threats for web site spoofing and man in the middle attacks.

FIG. 11 illustrates a unique feature of the invention allowing its ability to manage the PKI lifecycle around any number of private communities of users. This screen provides an example of the ability of the solution to do this for users of the SDC service. Users can create private, public, and group specific address partitioning for the service. Participants can also control who can see and access their SDC address by registering as public, private, or group users. A unique feature of the invention is it ability to manage the PKI lifecycle specific to the segmentation of users by service.

FIG. 12 is a view of the SDC client running the SDC service. There is a separate and distinct login for the SDC client that authenticates the user against a local credential store. In addition, authentication can include the use of an authentication service over the SSN. This allows for the support for additional strong self service authentication. Examples include the use of the CAS described in previous art and incorporated herein as well as common standards like XML certs, LDAP, OLDAP, SAML, Secure ID, Key Fob correlation, biometrics, Active Directory, and Cert Verification Services.

Figure 13:
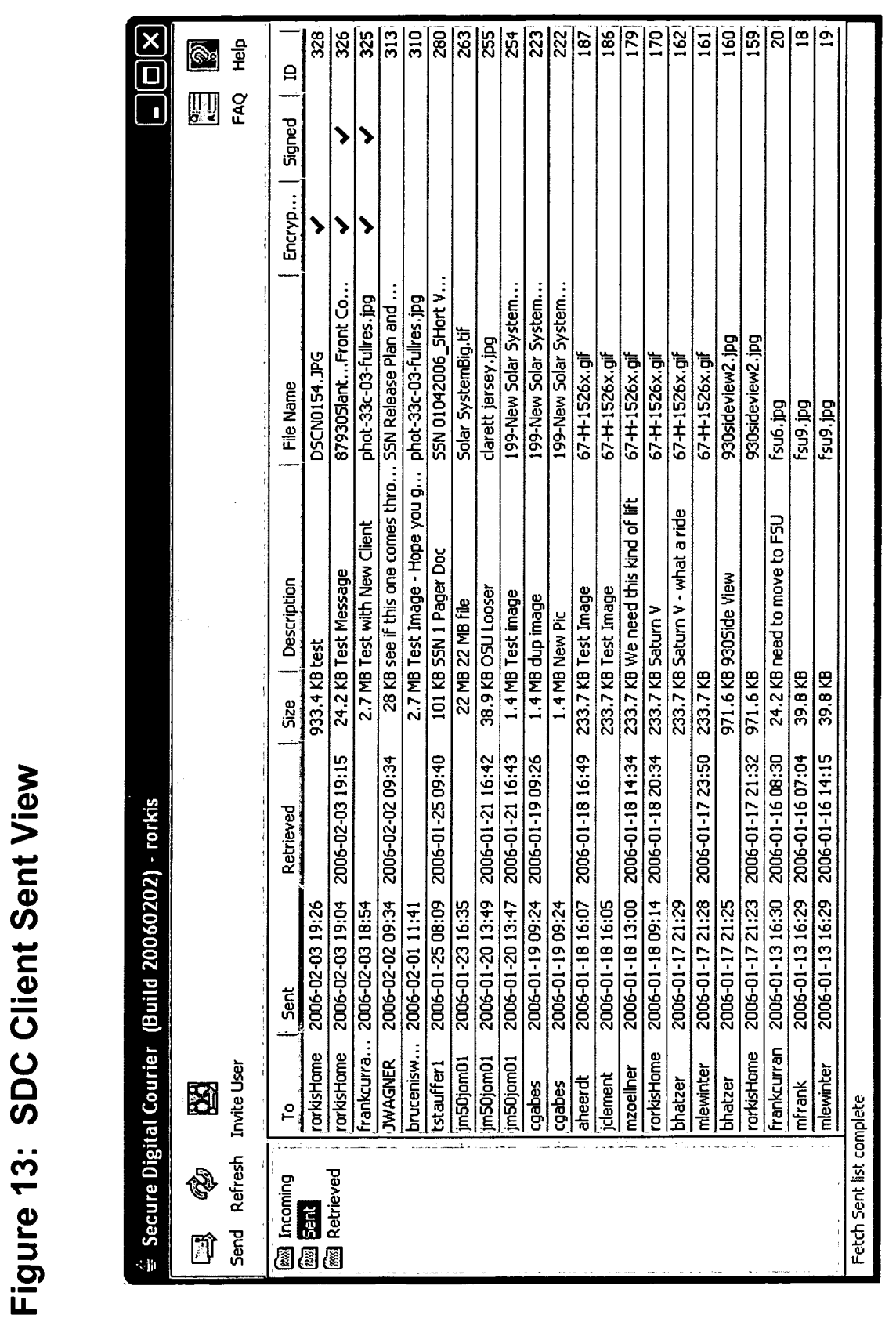

FIG. 13 is a view of the SDC client running the SDC service in the Sent view. Detailed information for all activity is shown for all items couriered. This includes: Who To, When Sent, When Retrieved, Size, Description, File Name, Encryption Status, Digital Signing Status, and item ID. In addition, optional notifications can be sent via many methods outside of SDC to participants.

FIG. 14 is a view of the SDC client running the SDC service in the Retrieved view. Detailed information for all Retrieved activity is shown for all items couriered. This includes: File Location, Trash Status, Who From, When Sent, When Retrieved, Size, Description, File Name, Encryption Status, Digital Signing Status, and item ID. In addition, optional notifications can be sent outside of SDC via many methods to participants.

FIG. 15 is an example of the notification that is sent to users alerting them that they have couriered material to be picked up. This notification is optional and can be tailored to the specific user, service, or user community. In addition, alternative notification methods may be used.

FIG. 16 is an example of the SDC delivered Notification that is sent to users alerting them that the material has been received by the intended recipient. This notification is optional and can be tailored to the specific user, service, or user community. In addition alternative notification methods may be used.

FIG. 17 is an example of the SDC enrollment acceptance notification sent when an invitation results in user enrollment. This notification is optional and can be tailored to the specific user, service, or user community. In addition, alternative notification methods may be used.

FIG. 18 provides a visual representation of the encryption supported by the invention. In standard mode the solution established mutually authentication SSL VSCs where the transport is encrypted and identity for authentication and authorization is extracted from the digital certificate of the participant. As a result, any information couriered over this transport is protected. In payload encryption mode the digital signing and/or encryption of the payload is done independent of the transport. When using a PKI environment this can be done with the public key of the recipient such that only the recipient can verify and decrypt the payload. This enables the SDC service to provide additional protections specific to the recipient and also allows the couriered material to be protected while at rest on the recipient's device, computer, cell phone, key fob . . . etc., A Secure Digital Courier Service detail is described: Accessing services published on a Secure Services Network requires a Secure Service Gateway. This gateway can be appliance based, hardware based or software based. In the case described herein a software based solution is detailed. In the instance described within this document a small but powerful java application or browser add on (SDC client) is used that can be configured to run on a wide range of devices including wireless smart phones, PDAs, laptops, specialized appliance, desktops, and large clusters of servers acting as a corporate gateway. For all participant requested and provided services there is a set of common infrastructure libraries and resulting services that implement the traditional fragments of security, reporting, and manageability in a comprehensive and integrated security solution. These include identity management and authentication, authorization, digital signatures, encryption, PKI management, billing, payload size, service status, ACL and CRL enforcement, and end to end logging, and transitive security and reporting.

In one implementation, the SDC Client is a native Java program that uses the SSG libraries and SSN services to communicate to other participants. A unique feature of the design is the ability to add new services with no changes to the core agent or client software. This allows all new services to inherit a base but comprehensive and integrated security model with no changes to the end point application or service that is actually fulfilling the business function. In this manner existing applications and web services can be run through the solution of the invention and be provisioned to SDC users. In an alternative mode an SDC specific client or agent can be used.

Much like the browser and its ability to uniformly render HTML, run Java, and establish http and https sessions, the SDC client solution provides a universal method for invoking services while enforcing a uniform and comprehensive security model for all services and transport specific applications running through it. This enables a services market place where service providers maintain absolute control over their services independent of any one else on the SSN.

The Secure Digital Courier client and service is downloaded from the Secure Services Network Portal and is invoked from the browser whenever sending or receiving a file. In addition to requesting a business service like SDC, the Java application also accesses a family of infrastructure services providing comprehensive security, provisioning, reporting, billing, and SLA monitoring that is used for consistency across all business services. As an example, infrastructure services are used to access a directory of users and retrieve their public keys which are used to encrypt files. In addition, uniform services and functions around encryption, billing, signing, key management, CRL and ACL enforcement, logging, SLA reporting, response time, cert verification are provided and available for consistent use by all services and service connections on the network.

A general overview of the basic processes supported by SDC service is provided. Enrollment allows participants to enroll, initialize, and be provisioned as a SDC user. This is as simple as going to the SDC web site, downloading the agent software, and initializing it with the SDC service. Multiple levels of participant validation are supported in order to enhance the authentication and reporting process. For example, this can range from just providing billing information, email address, and picking user ID, to requiring a valid mailing address, government issued ID, as well as additional information that can be validated by third party sources or validation services running in the SSN environment. In addition, the authentication library and processing described in prior art can be integrated to support strong self service authentication and enrollment. This unique feature allows for low cost enrollment and distribution as well as targeted marketing and advertising. A unique feature of the solution is the private enrollment process. In this manner anyone that wants to use the service must be invited by a current user where an invitation code and key is sent to the invited participant. This information along with the invite email address is used to assure an invite only community of users. This assures that the community of users is not anonymous and is linked to other users for validation. This enables a unique feature of the invention where private communities/directories of users can be created and maintained as well as groups and public directories.

By leveraging the Common Authentication Service (CAS) and authentication and process model described in prior art a strong self service authentication and enrollment model can be enforced and managed with respect to the risk profile of the participants and couriered material. In this manner multiple levels of user communities can be supported where specific security parameters and processes are enforced on a community by community basis.

Sender: There are several sender modes supported here. One in which the recipient is already a registered participant and one in which they are not. Simplified versions of these processes are outlined below. All activity is secured with a minimum of SSL (Secure Sockets Layer) mutual authentication and service specific authorization.

Registered Participant: In this case the sender looks up the participant in a directory and IDs them as the recipient of the material to be couriered. The service takes over from there. The digital material is optionally digitally signed and encrypted such that it is tamper proof and only the recipient can decrypt it.

Non Registered Participant: In this case the sender (already registered) completes an invitation process that includes information on the recipient. The system notifies the recipient (via email and other sources as options) that they have an SDC item to be picked up. To receive this item, please register at this site. Once the receiver registers, the document will be delivered and a notification and receipt will be created for the sender. As part of the invite the recipient will have the option to register as a sender or recipient only. As part of the registration process participants may identify their directory information as public, private, or group specific. This allows for the restriction of contact information among any number of sets of users and allows the participants to control the creation of secure business service communities with varied processes around critical business functions.

A unique feature of the service is that one or more unique invitation keys are included in the invitation notification. This key allows the invitation to be tied to many unique elements around the intended participant allowing for stronger authentication. As one example this key can be linked to email address, street address, phone number or personal items like name of your dog . . . etc. In this manner the solution can support a strong authentication self enrollment security model while allowing for the rapid expansion of users. Coupling this with previous art (CAS—Common Authentication Service and Library) allows the creation of a series of challenge questions for new users as part of the invitation and enrollment process further enhancing security around a self enrollment process.

Manage Contacts/Service: Senders have access to details about their SDC items and general account activity via a web site accessed from any browser or from the Secure Service Desktop client. This includes: a) Account Management; b) Activity History and Billing; c) Courier tracking and status; d) Receipt Notification and Archive; e) Status of their installation and security credentials; f) Back up and recovery features; g) Portability options; h) Payload Security Option Validation; i) Signed; and j) Encrypted.

Recipient: The recipient will either be a registered user or a non registered user. For registered users the SDC Client handles everything. It runs on any device that supports Java. For non registered users, they must download the SDC Client in order to receive absolutely secure SDC items. Optionally recipients will be able to download SDC documents that are secure but not encrypted specific to the recipient via a browser client and a user ID and password. This may meet the need of a specific user type and is an example of the flexibility of the solution to tailor security and business processes to specific user or participant groups without effecting other services or groups. This mode does support full secure transfer of the item but provides a lesser level of security due to its in ability to support the digital signing of the document and the encryption of the payload independent of the encrypted transport but specific to the end recipient. In this mode SDC can no longer assure that only the recipient can open and read the payload. This is a sever limitation of common SSL based x-fer functions today.

Features of the Secure Digital Courier service include the following which in combination are not available today: a) Privacy of the data and the relationship; b) Protection of the package contents such that only the recipient can view, read, or alter its contents; c) Auditable knowledge and record of the authenticated sender and receiver; d) Auditable delivery notification; e) Detailed receipt and audit trail for delivery; f) Low cost; g) Guaranteed authenticity that the item is as created by the sender and has not been altered in any way: h) Ease of use; i) Self enrollment or highly automated enrollment over the internet; j) Invitation only keyed enrollment for strong self service authentication; k) Support for unlimited file sizes; l) Support for unlimited users over any IP network connection; m) Support for unlimited reach over any network connection; n) Multi-level security that is user friendly, comprehensive, cost effective, and simple for the user to implement; o) Multi-level encryption that can use one or more PKI CAs; p) Support for transitive security around authentication, authorization, and encryption; q) Portability across many platforms and networks; and r) Flexible in the ability to implement additional services over the same SDC client and SSN infrastructure.

In one embodiment of SDC, a PKI infrastructure is incorporated into the service offering along with self service registration, Key distribution and management. This allows the private and public keys of participants to be used for participant specific payload signing, encryption, and authentication. This approach assures end to end audit, reporting, non-repudiation, and supports the protection of data while at rest specific to the recipient. The solution enforces Mutual Authentication for all activity assuring the identity of the participants before allowing a virtual service connection (VSC). In one implementation the VSC is a mutually authenticated SSL VPN using digital certificates and PKI for identity and encryption.

All service activity on the network is protected with transport encryption (SSL or otherwise encrypted network connection) that is specific to the participants in the activity (service). In one implementation identity is linked to digital certificates for all users and managed under a PKI lifecycle process model. The certificate used for identify can be combined with an identity service (CAS as an example) to assure all participants are authenticated and authorized for each and every activity. Authorization is enforced on a service by service and service provider to requestor basis and specific to a provisioning of one or more services to one or more participants. In one implementation a function specific SSL virtual private network is created based on the mutual authentication from digital certificates and then an ACL is used for service and participant specific authorization for access to an individual service. A unique feature of the invention is the ability to manage the ACL locally to a user, centrally, or in a hybrid mode allowing control to be maintain by the service owner independent of anyone else. This allows for multiple governance models as described in prior art around SMFSN/SSN.

Encryption is provided for all service network traffic including enrollment assuring all information is secure, private, and confidential The invention includes PKI and PKI lifecycle management for digital signing of couriered information such that one can assure who originated it and that it has not been tampered with. External CAs can be easily integrated using a PKI CA service definition in the solution. The invention includes a unique use of PKI at multiple levels including identity, transport encryption, payload encryption and mutual authentication for SSL negotiation. The result, is that multiple levels of security (can use more than one PKI CA) must be breached in order to compromise any couriered material.

The invention has the ability to encrypt the payload independent of the encrypted network connection and specific to a participant (e.g., Recipient) such that only that participant (e.g., Recipient) can decrypt the couriered material and the couriered material may be protected while at rest in the receiver or sender side is an example of this unique functionality. The invention includes secure end to end audit and reporting allowing the linking together of activity, authentication, authorization, and encryption for all service activity. This includes PKI lifecycle management for all participants using the service. The invention includes a unique self service enrollment model that supports invitation only private, public, and group enrollment with strong multi-factor authentication and participant verification.

The Secure Digital Courier (SDC) service is designed in a manner that leverages the success of the Internet/networks and their universal connectivity but enables the movement of information in a guaranteed secure, private, and unaltered manner not available today. The service not only delivers the document instantly and securely but also provides a complete audit trail of who sent what to whom, proof that the document was not tampered with and that the document was actually picked up by the identified recipient. Unlike other "secure" email and file sharing solutions, SDC includes a comprehensive set of security elements that are integrated and managed in a total integrated solution not available today.

The SDC service includes: a) Accurate knowledge about the identity of the sender and receiver; b) Documented proof that the document was actually delivered to the identified recipient's secure digital courier inbox; c) Proof that the document can only be viewed by the recipient or someone authorized to access the document; d) Validation that the document delivered was the original and not altered in any way; e) A convenient and timely receipt that summarizes the details associated with the original document and the delivery process; f) A private self service registration and provisioning model that allows participants to send documents to current members and to individuals that are currently not registered through a private enrollment process that leverages the uniqueness of the relationship of the party's to assure strong enrollment authentication; g) The ability to encrypt the couriered material such that only the intended recipients can un encrypt it; h) Ability to encrypt the couriered material such that only the intended recipient can un encrypt it and that the information may stay encrypted after transmission protecting it while at rest; i) Ability to assure that all information (except for email notifications) is shared in a secure and encrypted manner including the initial enrollment process; and j) A private self registration model that protects the participant and allows for the creation of private, public, and group secure service communities where security is inherent to all service traffic.

The invention thus includes a Secure Digital Courier service, management, reporting, enrollment, and self service authentication model for the secure distribution of digital files and information over any un-trusted network connection where end to end security, audit, and recipient specific signing and encryption is supported such that any file can be sent securely with absolute assurance that the file or documents can only be seen by the intended recipient. The combination of processes and comprehensive security enables the creation of vast secure public and private service communities over any IP network. The result is the ability to create and manage an unlimited number of Secure Service Communities independent of network carrier or IP transport. SDC is one example of this.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims.

What is claimed is:

1. A method for managing a virtual secure service network comprising:
   (a) providing a plurality of network connectible digital devices;
   (b) creating private secure service communities by extending a private invitation from an existing participant in the network to another potential participant, wherein the invitation correlates to network enrollment through one or more unique artifacts associated with one or more of the invitation and the relationship between the parties to the invitation;
   (c) mutually authenticating network service activity between participants;
   (d) providing a virtual connection to a service for network participants;
   (e) associating each network participant with a network connectible device;
   (f) controlling authorization specific to a service and service relationship to a participant by the provider of the service;
   (g) using an authenticated secure sockets layer to provide transport encryption for the participant to the network where the participant to the network connection is authenticated prior to the delivery of the service;
   (h) using a unique service identification for each activity that links authentication, authorization, usage, and encryption for the participant to the network specific to the instance of a network activity;
   (i) providing end to end reporting of each instance of network activity;
   (j) providing privacy to each instance of network activity on the service to the participant;
   (k) digitally encrypting the payload or service content specific to the recipient of the service invocation by a network participant;

(l) providing the secure service network and an administration layer as a virtual network overlay to network connections above a pre-existing physical network configuration; and (m) administering the applications layer by the secure service network layer in accordance with predetermined criteria limiting access by a network participant only to applications allowed to the participant by the secure service network layer.

2. A method of claim 1 wherein a digital signature for payload or service content independent of the transport encryption and specific to the recipient or parties to an instance of use of a service is applied to the network participant requesting a service invocation.

3. A method of 1 claim wherein the payload encryption protects the payload while at rest within any fixed or mobile storage device such that only a predesignated network participant to a service invocation can decrypt the contents.

4. A method of claim 1 wherein transitive security is established through combined elements of security provided by elements of the virtual service connection.

5. A method of claim 1 wherein a digital certificate associated with a participant is applied to permit portable indicia of a participant's identity on a secure service network, and a token, a biometric characteristic or secret employed in combination with a network library of authentication indicia is accessed over the network by a participant requesting access to a network activity.

6. A method of claim 1 including out of band notification of service activity over a network that is not the secure service network utilized by a participant.

7. A method of claim 1 including in band notification of service activity over the secure service network.

8. A method of claim 1 including XML digital certificate authentication between or among network participants as a component of a service associated with an instance of a service invocation.

9. A method of claim 1 wherein authentication is based on Security Access Markup Language (SAML) and access to one or more identity servers managed by participants on the service network is via a service on the secure service network.

10. A method of claim 1 wherein a software node on the secure service network is self provisioned and the node is registered on the secure service network.

11. A method of claim 1 wherein more than one set of digital certificates are associated with network participants; one or more certificate authorities is associated with each set of digital certificates; and a service on the network validates each certificate with the respective issuer and or signer of the certificate.

12. A method of claim 11 wherein one or more certificate authorities is associated with each set of digital certificates associated with a participant to the network and a service on the network validates each certificate with the respective issuer and/or signer of the certificate.

13. A method of claim 11 wherein the use of more than one set of digital certificates provides multiple levels of encryption and one or more certificate authorities is associated with each set of digital certificates and a service on the secure service network is used to validate each certificate with the respective issuer and/or signer of the certificate.

14. A method of claim 1 wherein the Web Services Security standard is used as a requirement of the security mechanism within the network to effect components of security for the authentication, authorization, and/or encryption of web services over the secure service network.

15. A method of claim 14 wherein a service on the network validates a digital certificate or security artifact in the service wrapper or payload transmitted by a participant prior to passing the service onto another participant on the secure service network.

16. A method of claim 1 wherein data is compressed and the payload and/or transport is encrypted and then decrypted by the participant.

17. A method in accordance with claim 16 where a Public Key Infrastructure (PKI) based container is created around the payload and a method compatible with PKI encryption is installed in the network connectible digital device to encrypt one of (a) the complete payload comprising one or more application and the service content associated with the one or more application, (b) one or more application separately as (i) a single application or (ii) a set of applications and (c) service content specific to a downloaded application and a permitted network participant.

18. A method of providing a secure service network in accordance with claim 1 wherein a service is provided as one of a networked web service, a networked function within an application, or a networked application.

19. A method for the management of a secure service network in accordance with claim 1 wherein (a) the network connectible digital device includes one of a network gateway, a router, a PC, wireless smart phone, a PDA, a laptop PC, a specialized appliance, a desktop PC; and (b) a network client application is installed on the digital device.

20. A method in accordance with claim 19 wherein the network connectible digital device includes a client application downloaded from the secure service network issued to a participant following acceptance of an invitation by the participant and the downloaded client application administers services provided by the secure service network.

21. A method of claim 1 wherein a participant's enrollment in the secure service network is determined by a participant's access to a network connectible hardware appliance that includes a client application for administering participant activity permitted by the secure service network.

22. A method in accordance with claim 1 wherein the managed secure service network includes a hosted global service controller offering services over the network for managing the provisioning of services, managing PKI certificates, governing enrollment, billing for activity over the secure service network, reporting activity over the secure service network, logging activity over the secure service network, and maintaining a database of accounts for the secure service network.

23. A method in accordance with claim 1 wherein the secure service network includes a hosted global service controller as a node on the secure service network layer offering services over the network for managing the provisioning of services, managing security certificates, governing enrollment, billing for activity over the secure service network, reporting activity over the secure service network, logging activity over the secure service network, and maintaining a database of accounts for the secure service network.

* * * * *